(12) United States Patent
Hackbarth et al.

(10) Patent No.: US 7,107,312 B2
(45) Date of Patent: Sep. 12, 2006

(54) APPARATUS AND METHOD FOR USE IN A DATA/CONFERENCE CALL SYSTEM FOR AUTOMATICALLY COLLECTING PARTICIPANT INFORMATION AND PROVIDING ALL PARTICIPANTS WITH THAT INFORMATION FOR USE IN COLLABORATION SERVICES

(75) Inventors: Randy L. Hackbarth, Western Springs, IL (US); James David Herbsleb, Naperville, IL (US); Graham John Wills, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 624 days.

(21) Appl. No.: 09/886,814

(22) Filed: Jun. 21, 2001

(65) Prior Publication Data

US 2002/0143877 A1    Oct. 3, 2002

Related U.S. Application Data

(60) Provisional application No. 60/266,791, filed on Feb. 6, 2001.

(51) Int. Cl.
*G06F 15/16* (2006.01)
(52) U.S. Cl. ....................... 709/204; 709/224
(58) Field of Classification Search ............... 709/204, 709/205, 223, 224; 395/200.57, 200.34; 345/753; 364/514
See application file for complete search history.

(56) References Cited

U.S. PATENT DOCUMENTS

| | | | | |
|---|---|---|---|---|
| 5,491,743 A * | 2/1996 | Shiio et al. | ................. | 709/204 |
| 5,608,653 A * | 3/1997 | Palmer et al. | .............. | 709/204 |
| 5,793,974 A * | 8/1998 | Messinger | .................. | 709/224 |
| 5,884,039 A * | 3/1999 | Ludwig et al. | ............. | 709/227 |
| 5,933,597 A * | 8/1999 | Hogan | ........................ | 709/204 |
| 6,061,717 A | 5/2000 | Carleton et al. | | |
| 6,185,602 B1 * | 2/2001 | Bayrakeri | .................... | 709/204 |
| 6,559,863 B1 * | 5/2003 | Megiddo | .................... | 345/753 |
| 6,598,074 B1 * | 7/2003 | Moller et al. | ............... | 709/204 |
| 6,760,749 B1 * | 7/2004 | Dunlap et al. | .............. | 709/204 |
| 2005/0120301 A1 * | 6/2005 | Humpleman et al. | ....... | 709/208 |

* cited by examiner

*Primary Examiner*—Paul H. Kang

(57) ABSTRACT

A so-called "OpenChannel™" conference is established by separating particular participants of the conference from those participants that are actually currently active in the conference. This establishes a type of virtual conference, i.e., meeting, that can be monitored by participants, i.e., users, without requiring them to be actively a part of the conference call. These particular participants are in a so-called monitor mode. These participants can readily change their state from the monitor mode to a listen mode or active mode, as desired. One advantage of this invention is that a long-term conference of months or even years duration can be set up, only incurring a cost to participants when they are active participants in the conference call.

22 Claims, 15 Drawing Sheets

FIG. 6 TeamPortal DATA ACCESS

TeamPortal DATA USE

PEOPLE VIEW DETAILS

OpenChannel VIEW DETAILS

APPARATUS AND METHOD FOR USE IN A DATA/CONFERENCE CALL SYSTEM FOR AUTOMATICALLY COLLECTING PARTICIPANT INFORMATION AND PROVIDING ALL PARTICIPANTS WITH THAT INFORMATION FOR USE IN COLLABORATION SERVICES

RELATED APPLICATIONS

This application claims the priority of the corresponding provisional application, Ser. No. 60/266,791, filed Feb. 6, 2001. U.S. patent applications Ser. No. 09/886,791 and Ser. No. 09/886,876 were filed concurrently herewith.

TECHNICAL FIELD

This invention relates to communications services and, more particularly, to collaboration services.

BACKGROUND OF THE INVENTION

Instant messaging systems allow participants in a group to see whether members of the group are logged on to the messaging system, and allow users, i.e., participants, to chat with each other using a text-based system. Collaborative tools such as NetMeeting, similarly, allow participants to see who is currently active in the system and allow the participants to join a conference and share documents. Email and voice mail systems allow participants to send pointers to documents and attach messages in the form of text and/or voice.

Current voice and data conferencing services, such as NetMeeting, provide participants the ability to have a conference in which applications can be shared together with voice conferencing. That is, one participant's applications can be visible in other participants' computers during a conference. Some simple visual display capability is provided that shows who is currently a participant in the conference. There are also a number of systems that manage virtual meetings so that the current participants are shown on a display screen via an icon, image or live video.

A major disadvantage of current voice conference arrangements is their cost; even if none of the participants is presently speaking they still consume resources and tie up phone circuits. Consequently, conferences are typically scheduled carefully in advance and are of a short-term in duration.

SUMMARY OF THE INVENTION

Problems and limitations of current conference arrangements are addressed in a so-called "OpenChannel™" conference by separating particular participants of the conference from those participants that are actually currently active in the conference. This establishes a type of virtual conference, i.e., meeting, that can be monitored by participants, i.e., users, without requiring them to be actively a part of the conference call. These particular participants are in a so-called monitor mode. These participants can readily change their state from the monitor mode to a listen mode or active mode, as desired. One advantage of this invention is that a long-term conference of months or even years duration can be set up, only incurring a cost to participants when they are active participants in the conference call.

One embodiment of the invention employs the automatic collection of speaker, as well as, participation information. In existing virtual meeting systems participants must manually enter the virtual meeting by employing some software on their individual computers and change their state of participation using applications. This embodiment of the invention, by contrast, monitors the states of all devices connected to the conference, either computer or telephone, and makes that information available to all participants monitoring the conference without requiring user-generated explicit commands to do so.

Another embodiment of the invention provides, in contrast to known conference and virtual meeting arrangements that cause the display of information on only the current state of the conference, "complete" information on the history of prior conference participation of each of the participants at multiple levels of granularity. Thus, a participant can review an OpenChannel conference that has been running for some interval, for example, a month, year or longer, and observe which participants have been active and/or actually speaking in the conference during each day of the interval, each hour of the day, each minute of each hour, and each second of each minute up to the current time.

DETAILED DESCRIPTION

Figure 1:
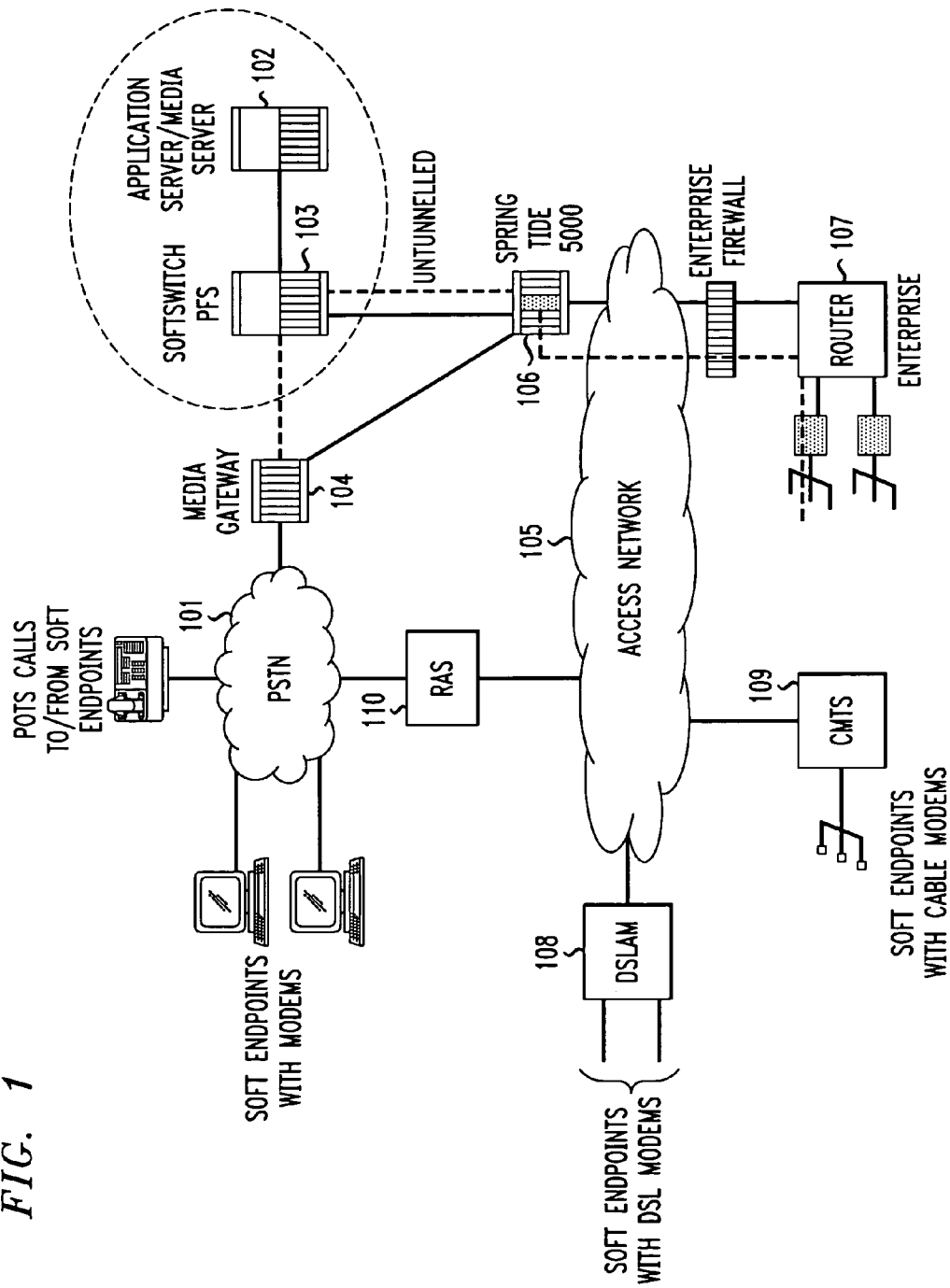
FIG. 1 shows, in simplified form, details of a communications network in which the invention may be advantageously employed.

FIG. 1 shows, in simplified form, details of a communications network in which the invention may be advantageously employed. The network supports connectivity to public switched telephone network (PSTN) 101 end offices for SIP (Session Initiation Protocol) Soft Endpoint to PSTN calls and the like. In this example, the network includes application server/media server 102 including an embodiment of the invention, softswitch programmable feature server (SPFS) 103 that inter-work with PSTN 101 through a Media Gateway 104, which converts between internet protocol (IP) and PSTN 101 formats. The Media Gateway 104 supports SS7 trunks to the PSTN End Offices, which can be the Lucent 7R/E Now switch or other vendor switches. The SS7 trunks may be E1 trunks for international applications or T1 trunks for NAR (North American Region) deployment. The Media Gateway 104 supports voice over IP (VOIP) calls originating from remote places and entering via modems. Inter-working with the access network 105 is through an IP service switch 106, such as the Spring Tide 5000. IP service switch 106 provides network-based firewall service, user identification and authorization and provides a platform for usage-based billing, dynamic virtual private network (VPN), tiered service selection and customer network management. Access network 105 interfaces to enterprise soft endpoints via router 107. Additionally, access network 105 interfaces soft endpoints with digital subscriber line (DSL) modems via Digital Subscriber Line Access Multiplexer (DSLAM) 108 and to soft endpoints with cable modems via cable modem termination system (CMTS) 109. Inter-working between PSTN 101 and access network 105 is via (Remote Access Server) 110.

The collaboration services, in accordance with the invention, are implemented utilizing Application and Media Servers 102 supported through the Softswitch Programmable Feature Server (SPFS). The SPFS is a programmable converged voice and data services platform for packet networks. In this example, it is based on the so-called Softswitch commercially available from Lucent Technologies Inc. The SPFS provides a service logic execution environment (SLEE) for service sessions, multimedia voice/video/data services, converged telephony/internet services, enhancements to "full circle" applications programming interface (API), and rapid service authoring and deployment by service providers or third parties. The SPFS services are provided to intelligent soft endpoints utilizing multimedia enabled protocols, such as Session Initiation Protocol (SIP) and H.323, and a WEB server interface to services.

The SPFS incorporates a services framework on the Softswitch base enabling services blending and the deployment of services in a generic and extensible fashion. The canonical call model, device servers, and SPFS service framework together enable the SPFS core service logic to be "access and transport neutral," and to inter-work calls among clients communicating with diverse protocols. The features of the SPFS required for the collaboratory services are third-party call setup and notification of on-hook/off-hook events for given telephone endpoints.

Any Service Logic Execution Environment (SLEE) capable of supporting these two features (e.g., Lucent Technologies' PacketIN) via any well known protocol (JTAPI, Pints/Spirits, SIP) can be substituted for the SPFS.

Figure 2:
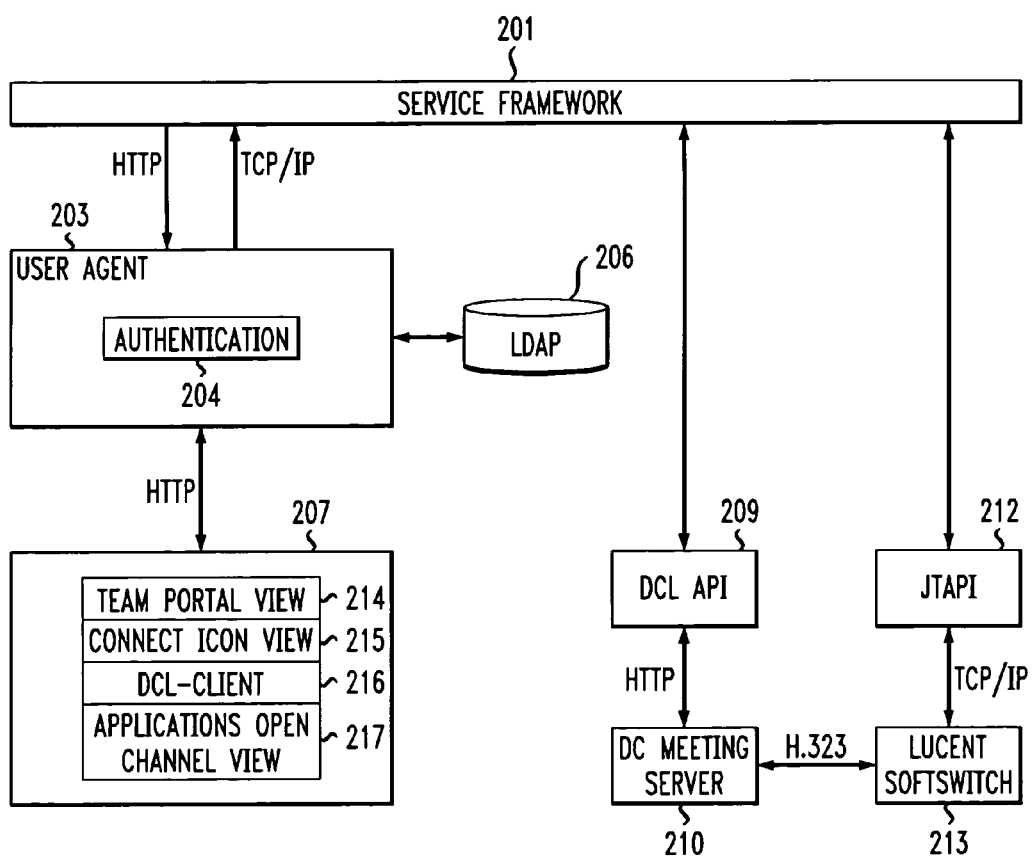
FIG. 2 illustrates, in simplified block diagram form, details of system architecture employed in practicing an embodiment of the invention.

The principal network components enabling the converged collaboratory services, depicted in FIG. 2 includes the following components:

Residing on the user's personal computer 207 are the following:

Presence Client components of: TeamPortal View 214, ConnectIcon View 215, and OpenChannel View 217, and DC-Client 216 for DC-MeetingServer 210.

Note that DC-MeetingServer 210 is a Direct Connection Limited (DCL) meeting server.

The SPFS Service Framework 201 is the architectural model enabling services blending and the deployment of services in a generic and extensible fashion. The Service Framework 201 architecture leverages object-oriented mechanisms to maximize independence in deploying new services. The service framework 201 is a Service Logic Execution Environment that is responsible for responding to requests for service and initializing connections between endpoints. The SPFS SLEE is implemented as a set of Java classes running in a Java Virtual Machine.

The User Agent 203 provides a point of contact between the intelligent endpoint and the service provider. It provides a WEB interface to an end user's browser, performs authentication, and initiates the service chosen by the end user, based on personalized preferences of the user. The User Agent is implemented as a set of Java servlets running on a WEB Server, of which the Authentication servlet 204 is shown as an example. As described below regarding FIG. 2, the service framework 201 interfaces with the Lucent Softswitch (LSS) 213 over JTAPI (Java Telephony API) 212.

Not shown in this diagram is an optional application that detects user presence activity on the Soft Endpoint. For a personal computer (PC), these are keystrokes and mouse events. Messages are sent from the application to the User Agent 203 when moving from idle to using the keyboard/mouse, or when there has been no activity for a user configurable time period (e.g., approximately 5 minutes). Other events that may be employed to indicate participant presence or not are, for example, logging on or off a system or service, timing out, i.e., no activity on the system or service for a prescribed interval, telephone on-hook or off-hook indication, a wireless connection or disconnect, or the like.

FIG. 2 illustrates, in simplified block diagram form, details of a system architecture employed in practicing an embodiment of the invention. Specifically, shown is the SPFS service frame work 201, DC-MeetingServer 210, with its own published API 209, user agent 203, Lucent Softswitch 213 with associated JTAPI interface 212, lightweight directory access protocol (LDAP) database 206, DC-client applications unit 216, TeamPortal View 214, ConnectIcon View 215, and OpenChannel View 217.

The SPSF 201, described above, is the Service Logic Execution Environment (SLEE) used in this implementation to set up calls and report on phone endpoint activity. Following is the list of the functionality required of the SPFS 201:

All conference call requests will be routed. It makes the connections between DC-MeetingServer 210 and LSS 213 by calling the Meeting server's API 209;

Constantly monitors (via JTAPI 212) the phone numbers registered with the system and sends all the useful events to user agent 203, which will update the LDAP database 206;

Monitors the conference calls in progress on DC-MeetingServer 210 using the API 209 and sends the speaker information to user agent 203.

The DC-MeetingServer 210 is a commercial application which bridges calls so as to provide conferencing services including Chat session, Application sharing, Whiteboard and video conferencing services. DC-MeetingServer 210 is a packaged conference/collaboration server solution. DC-MeetingServer 210 provides core data conferencing capabilities for standard T.120, H.323 conferencing clients such as Microsoft's NetMeeting, Sun Microsystems' SunForum, etc. As a server-based solution, DC-MeetingServer 210 provides support for firewall protection, multi-party audio and video, centralized administration and diagnostics, security, and billing services.

The SPFS 201 uses the DCL published API 209 to set up and monitor conference calls. Also, approximately every one minute, it retrieves a list of all users who have participated in a conference in that minute period. It also retrieves a list of users who spoke on a conference in that period.

User Agent 203 is central to the provision of collaborative services. User Agent 203 is responsible for maintaining presence data, i.e., information, for the registered clients. It maintains lists of subscribers and notifies subscribers of changes in status. The User Agent 203 maintains a LDAP database 206 in which presence information is maintained for each individual registered with the system. It also supports Presence Clients that register with it. These clients include TeamPortal View 214, ConnectIcon View 215, and OpenChannel View 217. Presence Clients are Java classes that run remotely and can both report changes in presence status and react to User Agent messages telling them that the Presence information has changed for a user they have defined as being in their awareness set.

Briefly, the User Agent 203 is a WEB interface to a database that stores information, i.e., presence information, on users that describes where and how the users are present in the network. This information can be used to indicate availability and the best way to contact, i.e., the best mode of communicating with, a user. Access to presence information is restricted based on user preferences that are stored in the User Agent 203. The User Agent 203 uses a LDAP database 206 to store the data, but direct access to the database is not necessary. Servlets in the User Agent 203 are used to request that presence data be created or changed and to request data or subscribe to presence data (a subscription to presence data means that the subscriber is notified when that data changes).

The user agent 203 includes a WEB server (with associated servlet engine) with a number of servlets that process HTTP requests. These servlets implement requests to set up connections (e.g. phone calls and conference calls), get data from a calendaring application, get information from LDAP database 206 and set information in the LDAP database 206.

The Lucent Softswitch 213 provides services to softphones with session initiation protocol (SIP) and H.323 clients, which perform service signaling for the SPFS through a packet access network. Calls among the softphone users route through the packet network. Calls between SIP and H.323 clients are inter-worked through the Lucent Softswitch (LSS) SIP device server and H.323 device server. Calls set up between a softphone and a phone on a PSTN (Public Switched Telephony Network) 101 (FIG. 1) end office use SS7 signaling through the Lucent Softswitch SS7 Device Server, with bearer traffic flowing through a media gateway to SS7 trunks to the PSTN 101 (FIG. 1). The SPFS interfaces to the Lucent Softswitch using the JTAPI API 212.

A presence client is a Java applet that is run within a browser and provides an interface to presence and connectivity information. It continuously updates to reflect the current state of the presence data retrieved from the User Agent 203 (and thence from LDAP database 206) and enables users to make connection requests. TeamPortal View 214 includes a set of these presence clients. All requests and data are accessed through the User Agent 203.

TeamPortal View 214 is a set of three presence clients that shows information for a single team. It shows information on each member of the team, namely:

(a) The current dates and times at the team geographic locations;

(b) The holidays and team member plans obtained from a team calendaring application; and (c) Member contact information and current presence status.

TeamPortal View 214 is designed, as a set of Java applets that work together, but are not required all to be present. It provides GUI features for click-to-dial, -to-email, -to-conference and see calendars, personal pages, etc. Each of these features is implemented by calls to the User Agent 203. Specifically, a TeamPortal View 214 is a dynamic visual representation of the members of a team whose members are located at geographically distributed locations. The TeamPortal View 214 provides a Web portal that (a) displays static team information, (b) provides a dynamic view of the team members presence and their current locations, which are collected automatically and up-dated in real-time and (c) enables contact to be made by members of the team using the Web interface to initiate email, chat sessions, person-to-person calls, conference calls or the like.

A ConnectIcon View 215 is a virtual entity stating one user's desire to connect to one or more other users. The ConnectIcon View 215 data is stored in the User Agent 203 LDAP database 206 and is made visible in the user's browser in a ConnnectIcon View 215. This provides a representation of each other participant's presence status and enables the participants receiving the data to contact each other via clicking. A user configures and sends a ConnectIcon View using servlets of the User Agent 203. ConnectIcon Views may include pointers to documents, notes, calendars and connection processes such as chat, voice, conference and application sharing. Specifically, a ConnectIcon View 215 is a dynamic visual representation of the participants of a group being invited to communicate together with their presence information, lists of documents and URLs (Uniform Resource Locators) to be examined, and a set of mechanisms (email, chat, voice, and the like) to initiate communication, each of which can be billed to the originator. The available presence information enables a user to employ the best mode of communicating for the instant purpose, namely, either asynchronous communication or synchronous.

An OpenChannel View 217 provides a visual process for monitoring the status of a conference call. It indicates which participant is active and/or speaking, which participant has been active and/or speaking recently and enables the participants to change their level of participation between full (listen and speak), listen only (no speaking) and monitoring (just the visual indication). It provides the facility to have a long-term virtual conference which consumes no resources, but which participants may monitor and see if any of the other participants has become active on. It also enables participants to replay sections of a conference. Specifically, the OpenChannel View 217 separates the logical state of a conference call from the actual connectedness of the participants. That is, OpenChannel View 217 separates participants of a conference call that are not active from those participants that are currently active in the conference call. This establishes a type of virtual conference, i.e., meeting, that can be monitored by participants without requiring them to be actively a part of the conference call. These participants are in a so-called monitor mode, and can readily change their state from the monitor mode to a listen mode or active mode, as desired.

Figure 3:
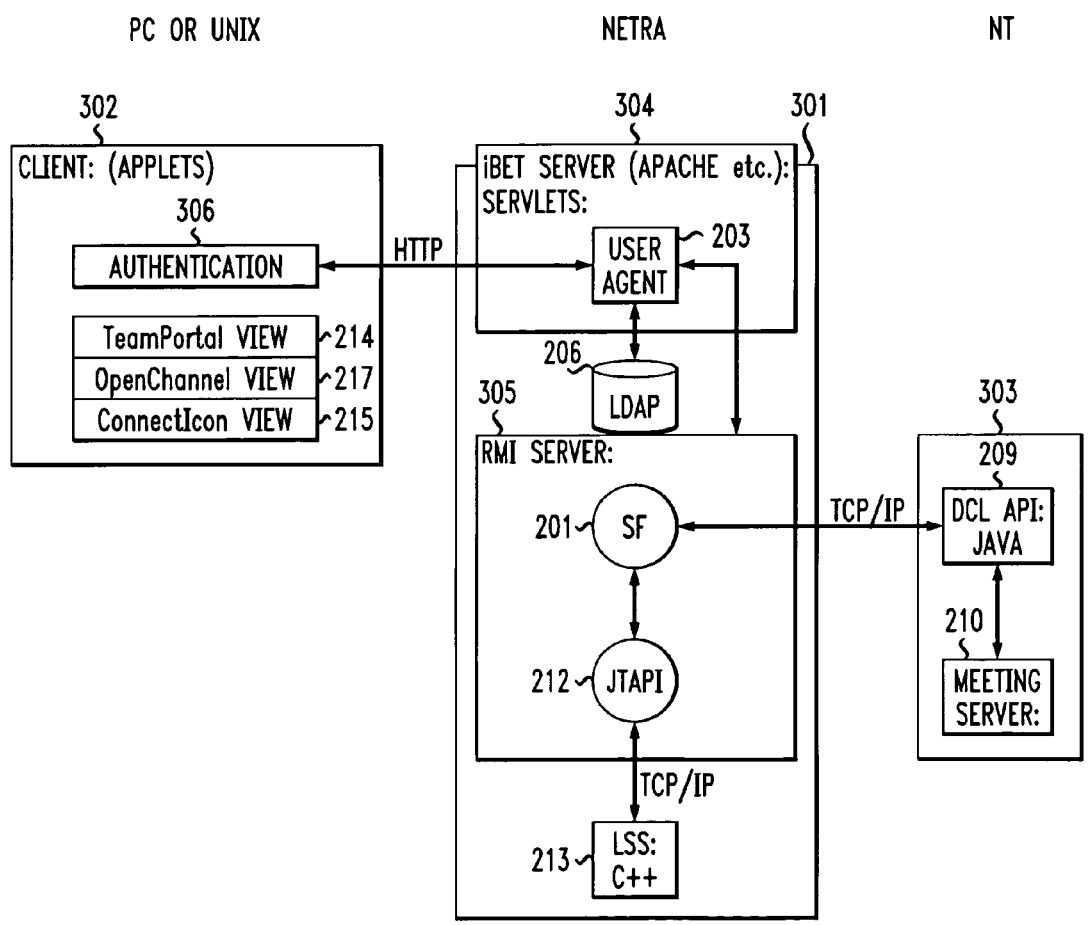
FIG. 3 shows in simplified form a network architecture employed in an embodiment of the invention.

FIG. 3 shows in simplified form a network architecture, a so-called services incubator, employed in an embodiment of the invention. The Services Incubator architecture is based on LSS 204, with an additional Windows NT processor that hosts the DCL media products. Specifically, A Netra-T Solaris processor 301 hosts the JTAPI Express software, running on JVM 1.2.x.

The following software components also reside on the Netra-T:

the SPFS operates on JVM 1.2.x. It is running as an RMI (Remote Method Invocation) server 305 which includes an implementation of necessary componennts of JTAPI 212;

the User Agent operates on an Apache WEB server 304;

the Windows NT processor 303 hosts the DCL media products.

Individual's WEB browsers (e.g. Internet Explorer, Netscape) 302 contain the Authentication applet 306, TeamPortal View 214, OpenChannel View 217 and ConnectIcon View 215.

The distributed system provides scalability, portability, and capacity. It enables resource sharing and legacy system reuse. Each component in the system could be on a different platform. The component allocation is transparent (i.e., not visible) to an end-user. In other words, the end user of a distributed system is not aware that there are multiple processes and/or platforms in the system.

The user agent 203 is a WEB server (with associated servlet engine) with a number of servlets that process http requests. These servlets implement requests to set up connections (e.g. phone calls and conference calls), get data from a calendaring application (e.g. Netscape Calendar), get information from the User Agent and set information in the User Agent, register users in the system and provide status information on the User Agent 203.

The servlets related to user validation, registration of new users, setting-up calls or conference call are:

Login

Login-description: Validate if a user is a registered user.
Arguments: It receives user-name and user-password.
The validity of the name-password pair is checked against the database entries. If vaildated, a token is places in the servlet session which indicates the user is logged in. Other servlets check for the presence of this token before execution and fail if it is not present.
Return [success] or [failure-reason]

Registration

Registration-description: Allow to capture user information.
Arguments: None.
Generate a form with field to be filled by the user.
The user information is included into the user's entry in the LDAP database 206.
Return [success] or [failure-reason].

Call

Call-description: request SF to create a call between two parties.
Arguments: It receives from TP "from-user" & "to-user" arguments.
If needed convert "from-user" & "to-user" to phone numbers.
Send call request to the Service Framework.
Return call status [success(call-id)|failure(reason)].

Conference

Conference-description: request SF to create a conference among several parties.
Arguments: It receives from TP "from-user" & "list-of-to-user" arguments.
If needed convert "from-user" & "list-of-to-user" to phone numbers.
Send set-up conference request to the Service Framework.
Return conference status [success(conference-id)|failure (reason)].

Add-Drop

Add-Drop-description: It removes or adds a user out/in an on-going conference.
Arguments: "user", "conference_id".
If needed convert user to phone number.
Send request to add or drop "user" from conference.
Return: status [success|failure(reason)].

User Agent Presence Servlets

The following servlets are installed on the User Agent WEBserver and are used by both Presence Clients and the SPFS to store and retrieve Presence data. Each of these servlets are based on a parent class termed the PresenceServlet class which provides utility processes for authentication and parameter requests.

Basic presence Servlets used to support Teamportal View 214

GetGroups—gets groups a user belongs to.
GetImage—gets the image of a user.
GetPeople—gets the people in a group.
GetSubscriptionChanges—gets any changes to presence data since last time this servlet was called.
SetPresence—sets presence information for a user.
SubscribeGroup—subscribes user to a group.

ConnectIcon View 215 Servlets

GetConnectIcon—gets ConnectIcon data.
GetConnectIconList—gets all ConnectIcons for a user.
GetCIPresence—gets presence data for ConnectIcon participants.
DeleteConnectIcon—destroys a ConnectIcon.
RefuseConnectIcon—refuses participation in a ConnectIcon.
SendConnectIcon—sends a ConnectIcon.
PreparedConnectIcon—changes a user's status for a ConnectIcon to "prepared".

OpenChannel View 217 Servlets

GetOpenChannel—gets basic OpenChanneldata.
GetOpenChannelList—gets all OpenChannels for a user.
GetOpenChannelChanges—gets recent data for OpenChannel.
DeleteOpenChannel—destroys a OpenChannel.
MakeOpenChannel—creates OpenChannel data structures with basic info.
UpdateOpenChannel—modifies OpenChannel data.

In addition to these classes that are used by the Presence Clients and by SPFS directly, there are three utility classes used by Servlets Config—stores URLs and configuration information.
PresenceServlet—base class for presence servlets.
PresenceTracker—provides utility processes for reading from and writing to the LDAP database 206.

Presence Clients

The presence clients are Java applets that can be run in any WEB browser. Each applet may work independently of the others, but if present in the same virtual machine (typically, in the same browser) they interact with each other so that (for example) clicking on person's presence information should show their current calendar plans and the time at their current location. Presence clients only interaction with the rest of the system is to make requests of the User Agent. These requests are HTTP requests to servlets that either gather information from the User Agent and user database or request a connection between parties.

The Presence Clients are not responsible for managing any communication, such as conference calls or application sharing. Their only function is to request that such a communication be set up (such a request goes to the User Agent 203).

The term User Agent 203 is used to describe the set of servlets running on a WEB server (in this implementation, this is the Apache Tomcat Server 304) with which the Presence Client Applets communicate. These servlets are the means by which data is stored in the Presence Database, i.e., LDAP database 206, and retrieved from the LDAP database 206. Processes for calling servlets from Java applets or applications and reading data from them into local storage are well know in the art.

Most of these servlets use the standard Java JNDI (Java Network Driver Interface) classes (available from Sun Microsystems) to access the LDAP database 206. In this example implementation, we use the OpenLDAP database, (available from the OpenLDAP foundation).

To store or update data in the LDAP database 206, the following steps must be performed:
1) A call to the servlet 'Login' with the name and password of the user. This will authenticate the subsequent calls to set the values of data;
2) A call to one of the other servlets with parameters describing the data and where it should be stored;
3) Checking the result returned by the servlet to ensure the call succeeded and handling failure.

The 'Login' servlet looks in the LDAP database 206 for the existence of the stated user with the stated password. If such a record exists, it places the user's name into the servlet session object (a well-known technique described, for example, in "Java Servlets" by Karl Moss, published by McGraw-Hill). It returns the text string "success" if the user has been validated and "failure" otherwise.

The following servlets store data on the LDAP database 206 server. Each of them first checks that the user's name has been stored in the session, which will only have occurred if the user has been validated correctly:
1) SetPresence
2) SetDeviceStatus
3) SendConnectIcon
4) DeleteConnectIcon
5) RefuseConnectIcon
6) MakeOpenChannel
7) DeleteOpenChannel
8) RefuseOpenChannel
9) UpdateOpenChannel
10) SubscribeGroup Servlets 2–9 in the above list use the JNDI classes (freely available from Sun Microsystems) directly to access the database using techniques well known in the art. Servlets 1 and 10 access it through calls to the User Agent 203.

The servlet 'SubscribeGroup' is called initially after the user logs in (via 'Login') and whenever the user changes the current group.

In this implementation, only the Presence Clients make calls to read data from the LDAP database 206 in the following manner:
1) A call to the servlet 'Login' with the name and password of the user. This will authenticate the subsequent calls to retrieve the values of data;
2) A call to one of the following servlets with parameters as described elsewhere in the documentation to retrieve data;
3) Checking the result returned by the servlet to ensure the call succeeded and handling failure;
4) Storing the text retrieved into local data structures as described below.

The following servlets retrieve data from the server. Each of them first checks that the user's name has been stored in the session, which will only have occurred if the user has been validated correctly:
1) GetGroups
2) GetPeople
3) GetOpenChannelList
4) GetOpenChannel
5) GetConnectIconList
6) GetConnectIcon
7) GetImage
8) GetPlans
9) GetSubscriptionChanges 'GetGroups' returns a list of names of groups that a user belongs to using a standard JNDI process. That list is stored as the TeamPortal Data Table 'groups' (e.g., 427 in FIG. 4), and a typical example looks like this:

members
-------
adam
bruce
catherine
. . .

'GetPeople' returns a table of information on people in a group using a standard JNDI process. That list is stored as the TeamPortal Data Table 'people' (e.g., 428 in FIG. 4), and a typical example looks like this:

| unique_id | name | phone | email |
|---|---|---|---|
| adam | adam | 5151212 | adam@aol.com |
| bruce | bruce | 5151213 | b134@aol.com |
| cat | cathy | 5151214 | cat37@aol.com |

'GetOpenChannelList' returns a list of OpenChannel data items for which the authenticated user is a member. After calling this to get the list of OpenChannel identifiers, the servlets 'GetOpenChannel' is called for each one to retrieve a set of data for each OpenChannel View. The OpenChannel View 210 data is described elsewhere in the documentation. These are assembled into the TeamPortal Data Table 'OpenChannels' (e.g., 431 in FIG. 4).

'GetConnectIconList' returns a list of ConnectIcon data items for which the authenticated user is a member. After calling this to get the list of ConnectIcon identifiers, the servlets 'GetConnectIcon' is called for each one to retrieve a set of data for each ConnectIcon. The ConnectIcon data (e.g., 430 in FIG. 4) is described elsewhere in the documentation.

'GetImage' is called to retrieve an image of the user. This image is stored in the table 'people' as an extra column. In this example implementation the images are stored as raw data defining a JPEG image and are retrieved and stored as standard Java Image objects.

'GetPlans' is called to retrieve a table of plans that looks like the following:

| unique_id | start | end | description |
|---|---|---|---|
| adam | 1/1/01 | 1/3/01 | "at a course in chicago" |
| bruce | 1/7/01 | 1/8/01 | "vacation" |
| cat | 1/1/01 | 3/7/01 | "in my New Jersey office" |

This is implemented by calling a commercial calendar server such as Microsoft Exchange using their defined API. This is described in "Microsoft Exchange 2000 Server Resource Kit", published by Microsoft.

'GetSubscriptionChanges' access the User Agent to provide Presence data stored in the TeamPortal 208 Data Table 'presence' (e.g., 429 in FIG. 4) and is described below in the section on the User Agent.

As indicated above, the User Agent 203 is a stand-alone Java application, which runs constantly and provides an improved interface to the LDAP database 206. The User Agent 203 implements the following process:

Initialization: when started up, the User Agent 203 creates a JNDI connection to the LDAP database 206 in a similar way to the servlets described above.

Figure 4:
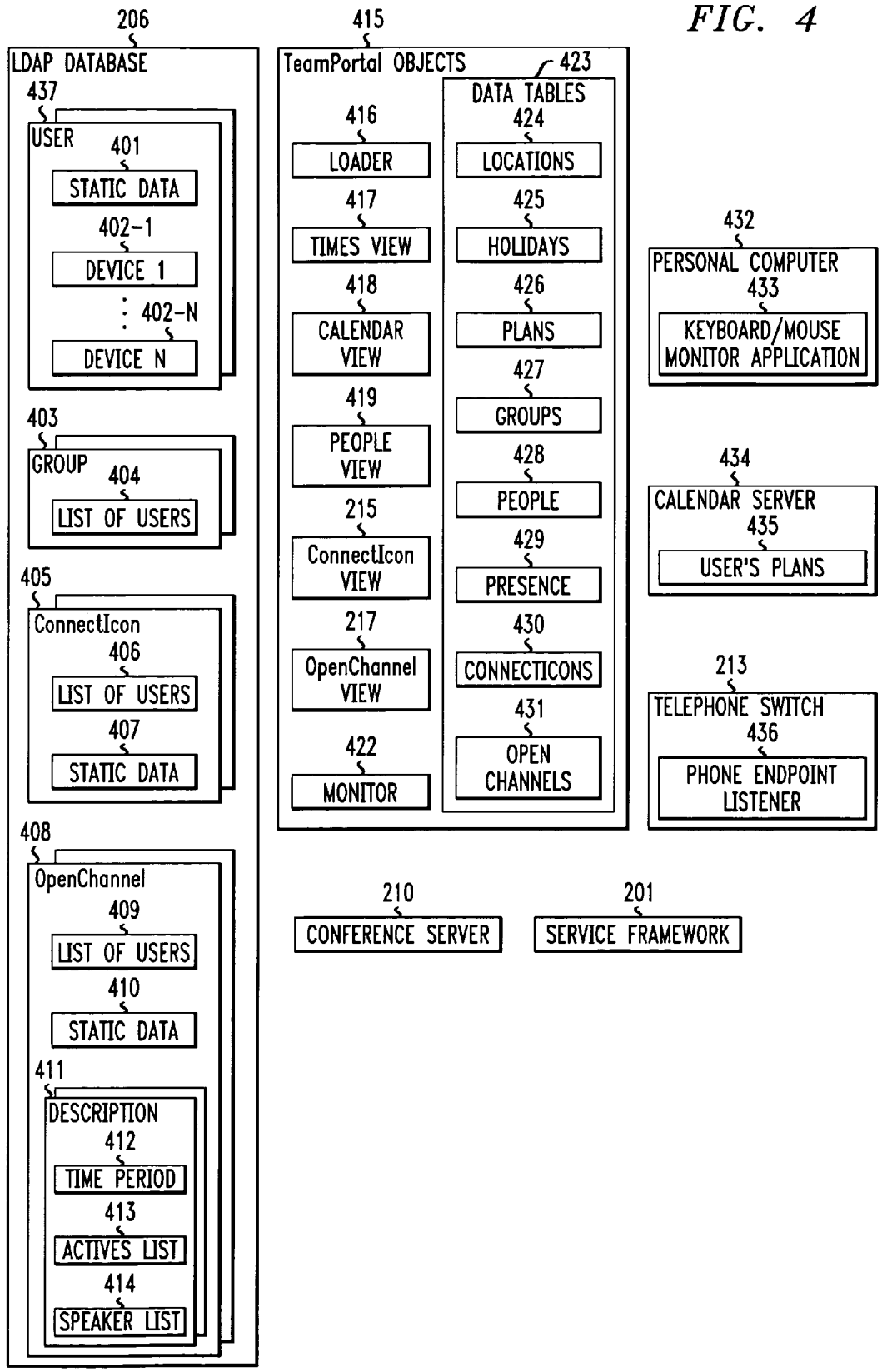
FIG. 4 is a diagram graphically illustrating the main objects utilized in an embodiment of the invention.

FIG. 4 is a diagram graphically illustrating the main software objects utilized in an embodiment of the invention. The tables in the database 206 are as follows:

A table of information on users 437, including static information 401 such as a unique id, name, email, and preferred phone number. The table also includes presence data 402 including a set of descriptions about which devices (phone, pc, PDA) a user has made use of.

A table of Groups 403, each of which lists a set of unique ids corresponding to those people who are members of the group. People may be members of more than one group.

A table of Connecticon Views 405, each of which contains static data 407, such as the Connecticon View unique id, title, message and communication mechanisms, as well as a list of users 406 who are particpants in the ConnectIcon View.

A table of OpenChannel Views 408, each of which contains static data 410 including the unique id and title of a conference. It contains a list of users 409 who have ever participated in the OpenChannel View and a set of records 411 containing descriptions of who has been active over the lifetime of the ConnectIcon View. These descriptions 411 each contain a time period 411 and lists of which users were active in the OpenChannel View and which ones were speaking during this time period.

A remote calendar server 434 such as Netscape Calendar or Microsoft's Exchange Server is used as a source of plans 435 for a user. These plans are created by software provided by the calendar provider and are only read by our implementation using supplied APIs well known in the trade.

One or more personal computers 432 may also be part of the system. Each such computer has a modified screen saver running that instead of dimming and brightening the screen, makes a http call to the User Agent SetDeviceStatus servlet to report on user activity, which is stored in the device information 402 of the user data 437 in the database 206.

A corresponding set of software objects exist in the user's WEB browser. These TeamPortal objects 415 consist of a Loader object that loads data from remote sources into local data tables 423, as described above. These local data tables are simple Java arrays that list the following information:

locations 424 at which team members reside or work, together with their time zones. These are read from URLs via the http protocol that contain static tables.

holidays 425 dates and descriptions of holidays for locations 424. These are read from URLs via the http protocol that contain static tables.

plans 426 copied from the calendar server 434 user plans 435.

groups 427 read from the groups table 403 of the database 206.

people 428 read from the static data 401 of the user table 437 of the database 206.

presence 429 read from the device data 402 of the user table 437 of the database 206.

ConnectIcon Views 430 read from the connecticons table 405 of the database 206.

OpenChannel Views 431 read from the OpenChannel Views table 408 of the database 206.

A monitor object 422 implements a Java Thread that regularly updates the local data tables 423 from their remote source by calling the Loader 416 to read tables from their respective sources into the local data tables 423.

The TimesView 417, CalendarView 418 and PeopleView 419 are the three Presence Client Views that define TeamPortal View 214. They and the ConnectIcon View 215 and OpenChannel View 217 are presence applications that present local data tables to the user in visual form and respond to user action request by changing the data displayed or calling the User Agent 203 to initiate phone calls, chat sessions, or email. Their operation is described in detail below.

Each of the Presence applications has been implemented using the same general approach, which consists of three parts needed to implement the full system:

Tables and schema are created in a LDAP database 206 (the 'Presence database') and simple Java servlets are written that store data into the database and read from the database. Thus, the LDAP database 206 is made available to any software process that can connect to it over the WEB. These servlets are standard servlets written to create a database connection to a local database system. In this example implementation, we have used the Sun Microsystems JNDI database connection API to connect to a standard LDAP database 206.

Software functions are added to a multiplicity of "devices" that report on device functionality. A "device" in this sense is a physical device such as a computer, phone, or PDA or a virtual device such as an email mailbox or a WEB portal such as TeamPortal View 214. All that is required for such a device to be used in the system is that some functionality is added so that the device can report when it is being used. In this example implementation we support the following devices:

TeamPortal View 214. When a user logs in to the system, that event is reported to the database Telephones. A user registers any number of his telephones with the Service Framework 201 that, in turn, uses an API such as JTAPI (Java Telephony API) to register interest in events related to that telephone on the Telephone Switch 213. This registration is described in standard JTAPI documentation. When the registered telephone is used, the Telephone Switch notifies the Service Framework which reports the event to the LDAP database 206.

Personal Computers. The user installs a modified screen saver application 433 on the computer 432 which, instead of dimming the screen and brightening it as the computer is left idle or used, reports the usage information to the LDAP database 206.

Client Java Applets (e.g., 417, 418, 419, 215, 217) are embedded in otherwise standard WEB pages which read data from the LDAP database 206 into local data tables 423 and display it on the screen. The data is automatically and continuously updated by the monitor object 422 and the applets provide menu items, buttons or other affordances that can be used to:

1) Email one or more people. This is achieved using standard Java Applet functionality.
2) Create a telephone call or conference and modify a conference by adding or dropping people. This is achieved by making such a requet to a WEB server servlet which forwards the request to the appropriate processes of the Service Framework 201, which makes the request of the telephone Switch 213 (using JTAPI 212) and/or a commercial Conference Server (using the Conference Server's proprietary API).
3) Chat to one or more people. The chat employed is known in the art as 'persistent chat' that is an enhancement of instant messaging style chat sessions so that chat messages are stored on the WEB server. This has the advantage that users can be sent messages when they are not logged in and they can view them at a later time when they do log in. This feature is very importance for teams separated by several time zones.

The Service Framework 201 is software that manages the interface to the telephone switch and the commercial conference server. In this example implementation, it uses JTAPI 205 to interface to the switch and RMI (Java remote process invocation) to talk to the WEB server servlets of the User Agent 203. When the appropriate process is called (via RMI) from a servlet it requests a telephone call from the Telephone switch 213 or a conference call from the Conference Server 210 (via the conference server's proprietary API 209). When it receives events from either the Conference Server 210 or the Telephone Switch 213, it calls the LDAP database 206 and stores the event there in the appropriate device record 402 of the correct entry in the user table 437.

Figure 5:
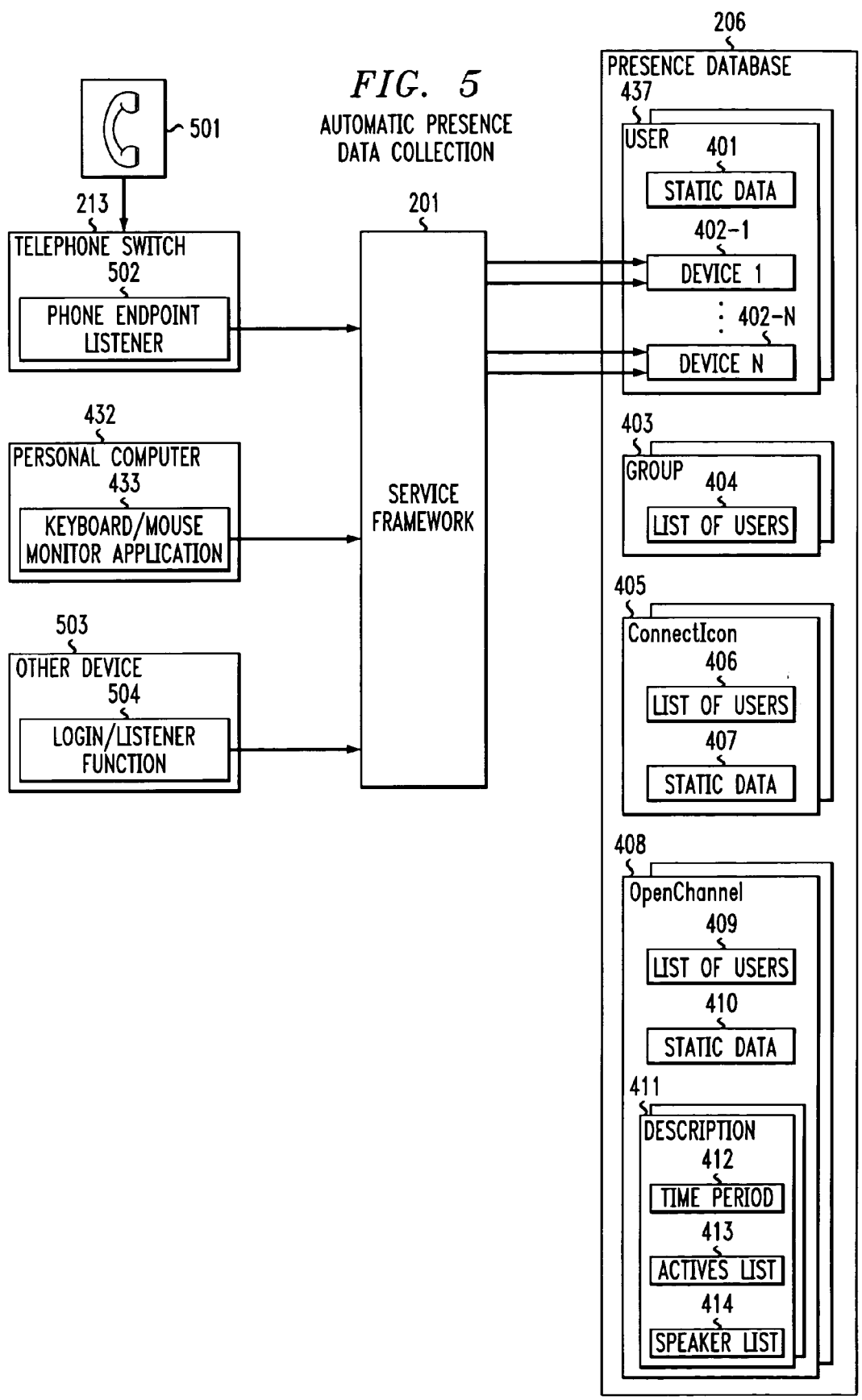
FIG. 5 is a flow diagram illustrating the flow of events that cause a user's presence data to be updated in the LDAP database.

FIG. 5 shows the flow of events that cause a user's presence data to be updated. In FIG. 5, 501 represents a telephone connected to a telephone switch 213. A phone endpoint listener 502 (a publically available part of JTAPI), running on that switch, reports events associated with that phone to the service framework using JTAPI 212 in our implementation. Other device 503 represents any device that can be used by a person on which a listener 504 can be installed that reports information on presence to the database 206 via the User Agent 203.

As an example, the following is a sample process when a registered telephone is used:

The user places a call using the telephone 501;
The Telephone switch 213 sends a JTAPI event to the service framework 201 stating that the phone is in use;
The Service Framework passes that information, with an added timestamp, to the User Agent 203 which matches the device to a user 437 and stores the time-stamped message in the correct device attribute 402 for that user.

A similar path is followed when the phone call terminates and when other devices are used.

The Presence Clients need to be able to read data from this database and to have their data refreshed when new data becomes available on the database. This is implemented by a Loader object 416 that Loads the data and a Monitor object 422 that regularly polls the server to see if new data needs to be loaded.

There is one Loader object for all Presence Clients running in a single browser (or Java Virtual Machine) in this implementation. When each Presence Client (also termed 'View' in this section) is instantiated it must first check to see if a Loader exists and create it if it does not. The Loader's main functionality is to serve up Tables of data (a table is an implementation of a database record. In this example implementation, it is essentially a Vector or Columns, where each Column is an array of java.lang.Object). Thus, a call to Loader.getTable("locations") will get the table of people from a static file in this example implementation, whereas Loader.getTable("groups") will call a servlet of the WEB server and ask for all groups that the user belongs to. The following tables are the same for all users:

Locations 424

Holidays 425.

And the others are dependent on he currently logged-in user, and will be returned as empty if no user is logged in. Specifically, Loader.getTable("groups")—returns all groups 427 a user belongs to,
Loader.getTable("plans")—returns all plans 426 for people in the user's currently selected group,
Loader.getTable("people")—returns all people 428 in the user's currently selected group,
Loader.getTable("presence")—returns presence information 429 for all people in the user's currently selected group and all people who are part of the user's set of ConnectIcon Views,
Loader.getTable("ConnectIcon Views")—returns all ConnectIcon Views 430 the user has sent or received and not deleted,
Loader.getTable("OpenChannels") returns all OpenChannel conferences 431 the user is a member of.

Initially, no user is logged in and the current group is at a null. When a user logs in, the data is refreshed and the current group is set to the first one returned by Loader.getTable("groups"). The user can change group using a call to the Loader 416 and that will also refresh the relevant data tables.

The Monitor object 422 is a Java Thread that runs continuously and updates data using the Loader. It both updates the presence tables 429, ConnectIcon View 430 and OpenChannel View 431 data at regular, user-defined intervals (typically every 10 seconds) and also updates the times displayed in the TimesView every minute to match the correct timezone-adjusted local time in each country.

Figure 6:
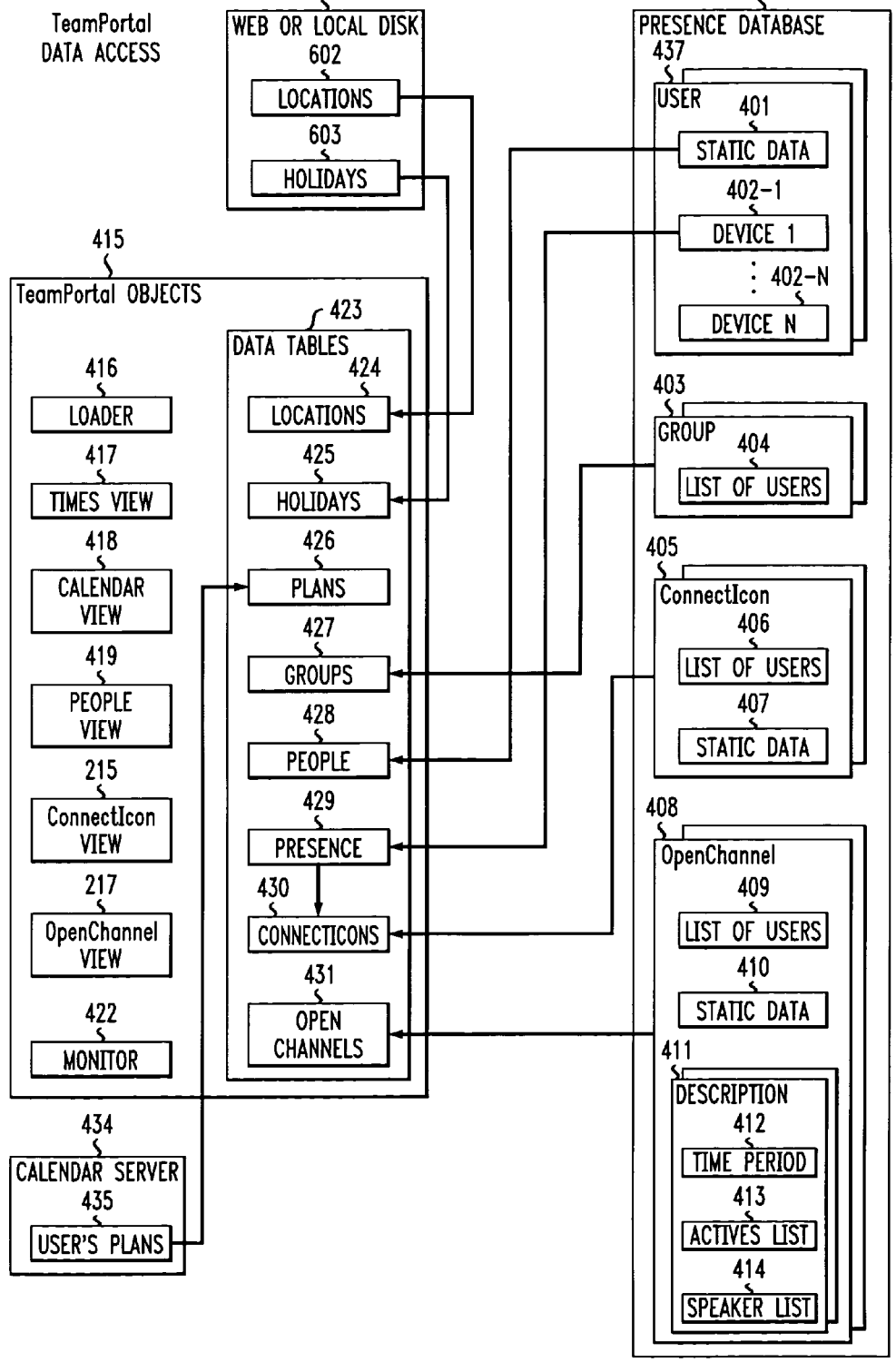
FIG. 6 is a flow diagram illustrating the flow of events in retrieving data tables in TeamPortal™ data access.

FIG. 6 shows classes and indicates where each Table 423 in TeamPortal Objects 415 is retrieved from. The static tables of locations 602 and holidays 603 reside as simple text pages 601 available via the WEB or on the local file system.

Figure 7:
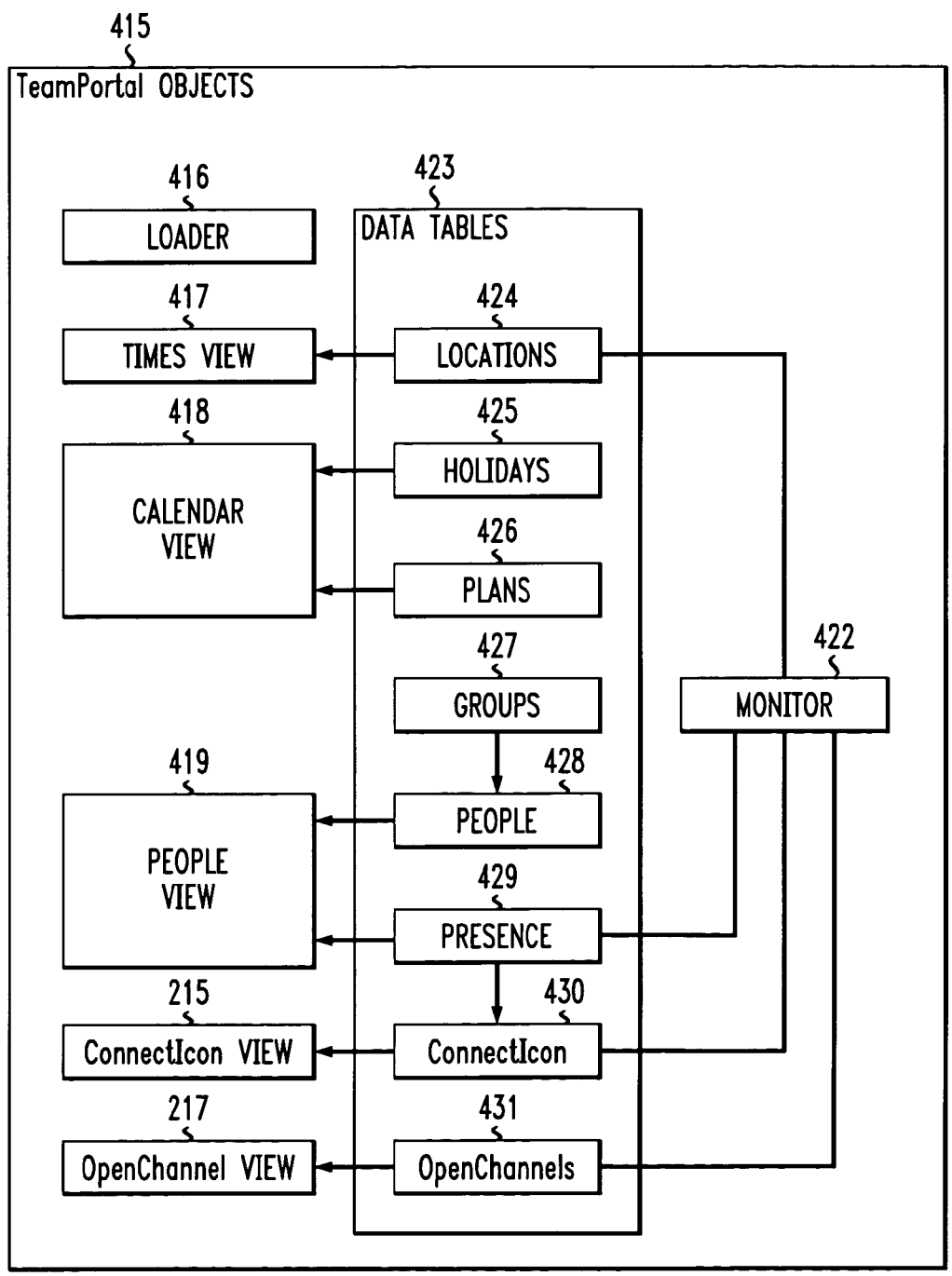
FIG. 7 is a flow diagram illustrating which Java Views use which data from a plurality of tables useful in describing the TeamPortal data use.

Each of the TeamPortal applets displays some of the data tables 423 in a WEB browser. FIG. 7 indicates which views use which data and so must be redrawn when their data updates. This is a transitive graph, so that when (for example) presence data 429 changes, so does ConnectIcon View 430 data (which contains pointers to the presence data) and so both the PeopleView 419 and ConnectIcon View 215 must be redrawn.

The TimesView 417 simply presents a scrolling list of locations, with the background color of each list item defined by the "locations" table and with text in each list item set equal to a catenation of the location name, country, and current time at that location. The latter is kept up to date by the monitor class 422 that reads the timezone information from "location" table 424 and access standard Java processes to get the date/time in that timezone. This scrolling list can be built on the ListView component of the standard Java Swing GUI component set.

The CalendarView 418 displays a standard month-at-a-time wall-calendar layout for a pre-defined set of months. It superimposes graphic representations of two sets of Tables on this background:

Holidays 425—the background of each day that is a holiday in a country found in the "locations" table is filled with the color associated with that location. Where more than one country have holidays on the same day, the space is divided amongst those countries;

User Plans 426—For each person in the "people" table, their plans are drawn as a series of linked dots in the corner of each day for which they have a plan noted. The color of the dots and lines is the same as that used to display the names in the PeopleView 419.

When the user moves the mouse over a day, all holidays and plans falling on that day are superimposed on the view in a similar manner to the technique used in Microsoft's ToolTips concept. This is achieved by having the Java view define a Listener for the relevant Java MouseEvents and redrawing the view with the super-imposed text information when the mouse is over a critical part of the view.

Figure 8:
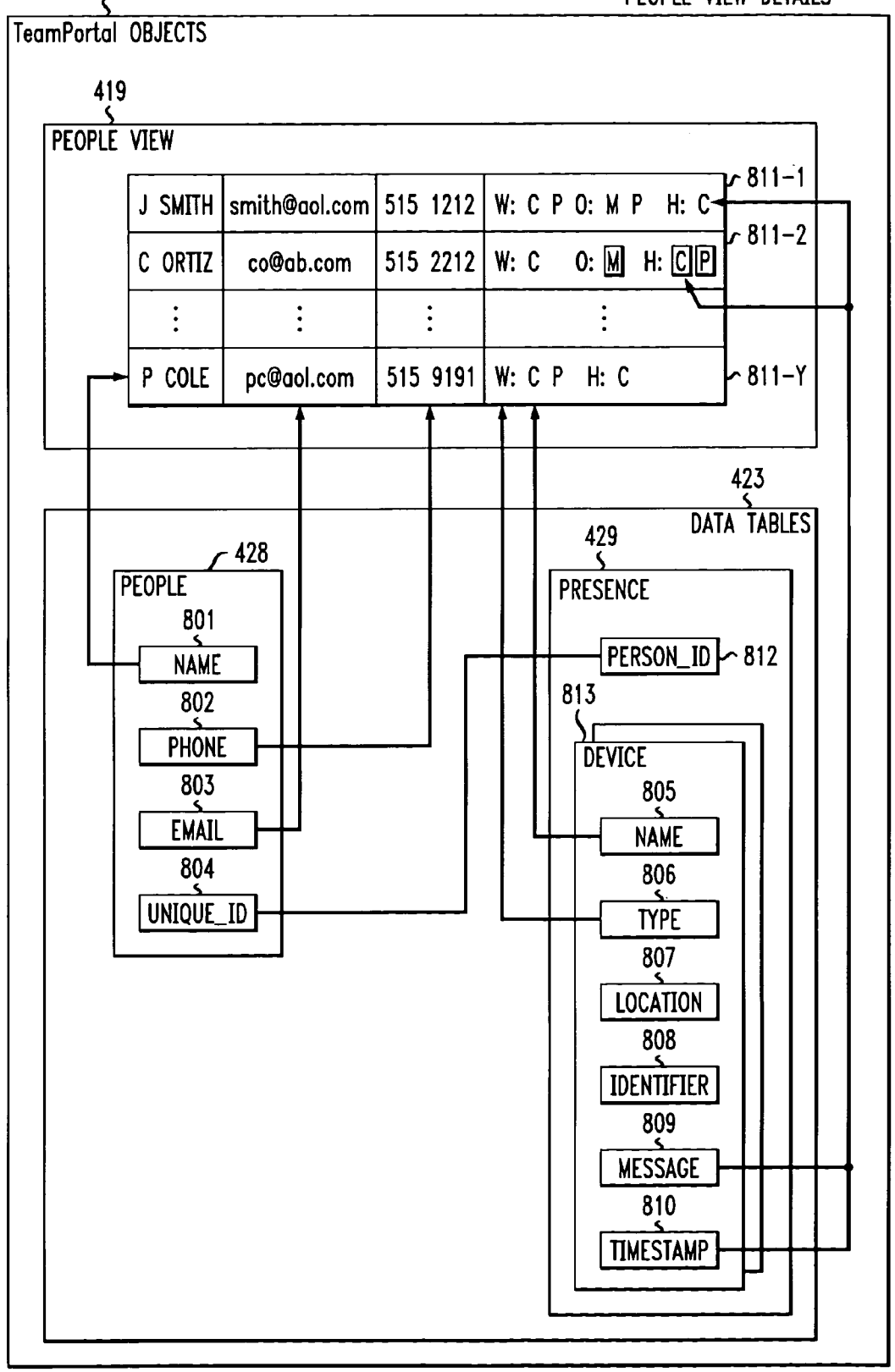
FIG. 8 is a flow diagram illustrating TeamPortal objects for team members.

The PeopleView, as shown in FIG. 8, is another list view, which this time can have one or more columns, depending on user preferences. In this FIG., the people data 428 shows the details of each person's static information, namely their name 801, preferred phone number 802, email 803 and a unique ID for the person, 804. The table of presence information 429 that is regularly updated, contains a set of devices for each person. Each set is linked into the people table 428 using the person_id attribute 812 to match the appropriate entry in the people table 428. Each device record 813 contains a free-text device name 805, a device type 806 which is one of a set of allowable devices (in our implementation this is one of "phone", "PC", "TeamPortal" View) a location 807 which is a text field which should be the same for all devices at a similar location, an identifer 808 that uniquely identifies the device given a user name or device type, a message 809 that is the last status message received from the device and a timestamp 810 which contains the time the last message was received.

The display the user sees on the screen is labelled 419. It is a Java List view with several columns. Each row 811 corresponds to information for exactly one person. All except one of the columns displayed in each row 811 show simple textual data mapped from the people table 428. The last column, though, contains a depiction of Presence Data for each person in the table. As this is a complex object, it must be drawn with more care. Here is the technique used in this example implementation to draw each of rows 811:

1) The unique id of the person whose data is at row i is read from the "people" table 428.
2) That unique id is used as a key to find the correct presence record in the "presence" table 429.
3) Devices of the record are aggregated according to their location parameter 807.
4) Each location is drawn in turn, with an icon (in this case a letter 'W', 'O', 'H', etc) used to indicate which location 807 is being drawn. For each location, all the devices in the record with that location parameter are drawn.
5) The type parameter 806, which specifies what kind of device is being shown, is mapped to an icon representing that type of device. In this implementation, a type of 'computer' maps to 'C', 'phone' maps to 'P' and 'teamportal' maps to 'M'.
6) The color of the icon to be drawn is chosen to indicate both the message 809 and the age of the message (derived from the current time and the message timestamp 810). In this implementation, the hue of the message codes whether it is a message indicating the device is 'in use' or 'finished use' and the darkness indicates the age. Thus a color of black indicates an old record, a bright green one indicates a 'recent finished use' message and a dull blue indicates 'medium aged in use' message.

The ToolTips style pop-up information described above for the CalendarView shows the exact text and date of the message when the mouse is moved over a device icon.

Figure 9:
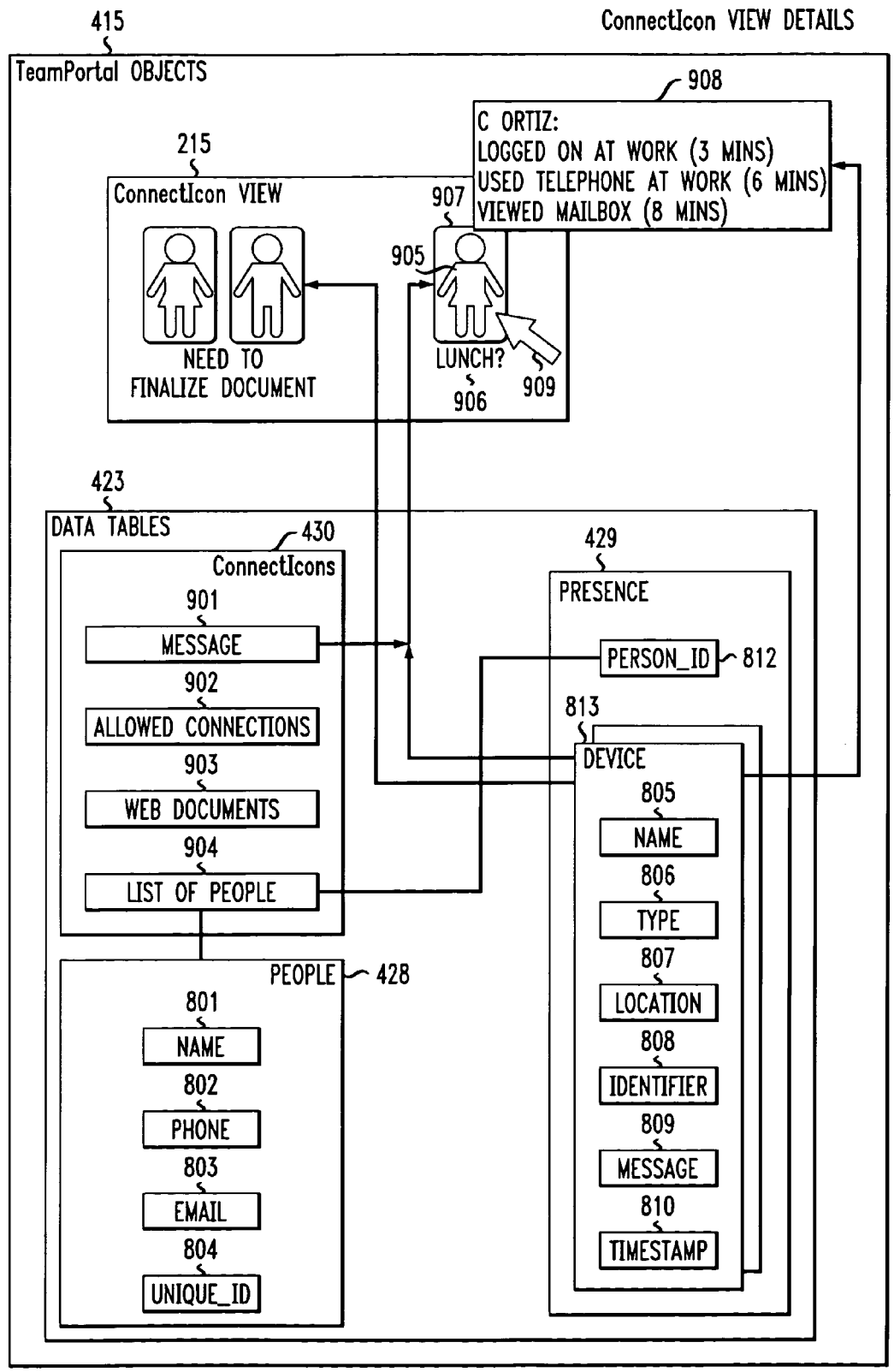
FIG. 9 is a flow diagram illustrating TeamPortal objects for a ConnectIcon View of the details.

FIG. 9 is a flow diagram illustrating TeamPortal objects 415 for a ConnectIcon View 215 of the details. The table of ConnectIcon Views 430 has been expanded to show the constituent fields; the subject message of the ConnectIcon View 901, the list of allowable contact mechanisms (Call, Chat, E-mail) 902, any document URLs that the sender wished to make available 903, and the list of people 904 to whom the ConnectIcon View has been sent, including the originator.

The ConnectIcon View 215 gives a list of views of individual ConnectIcon Views, and may be scrolled when the list is large. Each ConnectIcon View is drawn as follows:

1) An image 905 of each person on the list of recipients (the person's unique_id is taken from the "people" table 428, and the image file corresponding to that person is retrieved from a WEB location storing those named files) is drawn side by side. The image is surrounded by a border 907 that encodes the presence data for that person. In this example implementation, the border is drawn with a color that encodes the most recent device information we have for that person using the same color system as in the PeopleView 419.
2) Under the set of images, the message 901 of the ConnectIcon View is drawn as a caption 906. The tooltips technique described above is used to show details on the presence data associated with each person, so that when the mouse 907 is moved over a person's image 905, presence details 908 are drawn on the display. Clicking on a user's image invokes a menu allowing group or individual mail, conference calls or chat sessions to be initiated. Also any WEB documents associated with the ConnectIcon View are listed and may be loaded into the browser by selecting that option. Another menu option allows the ConnectIcon View to be deleted.

Figure 10:
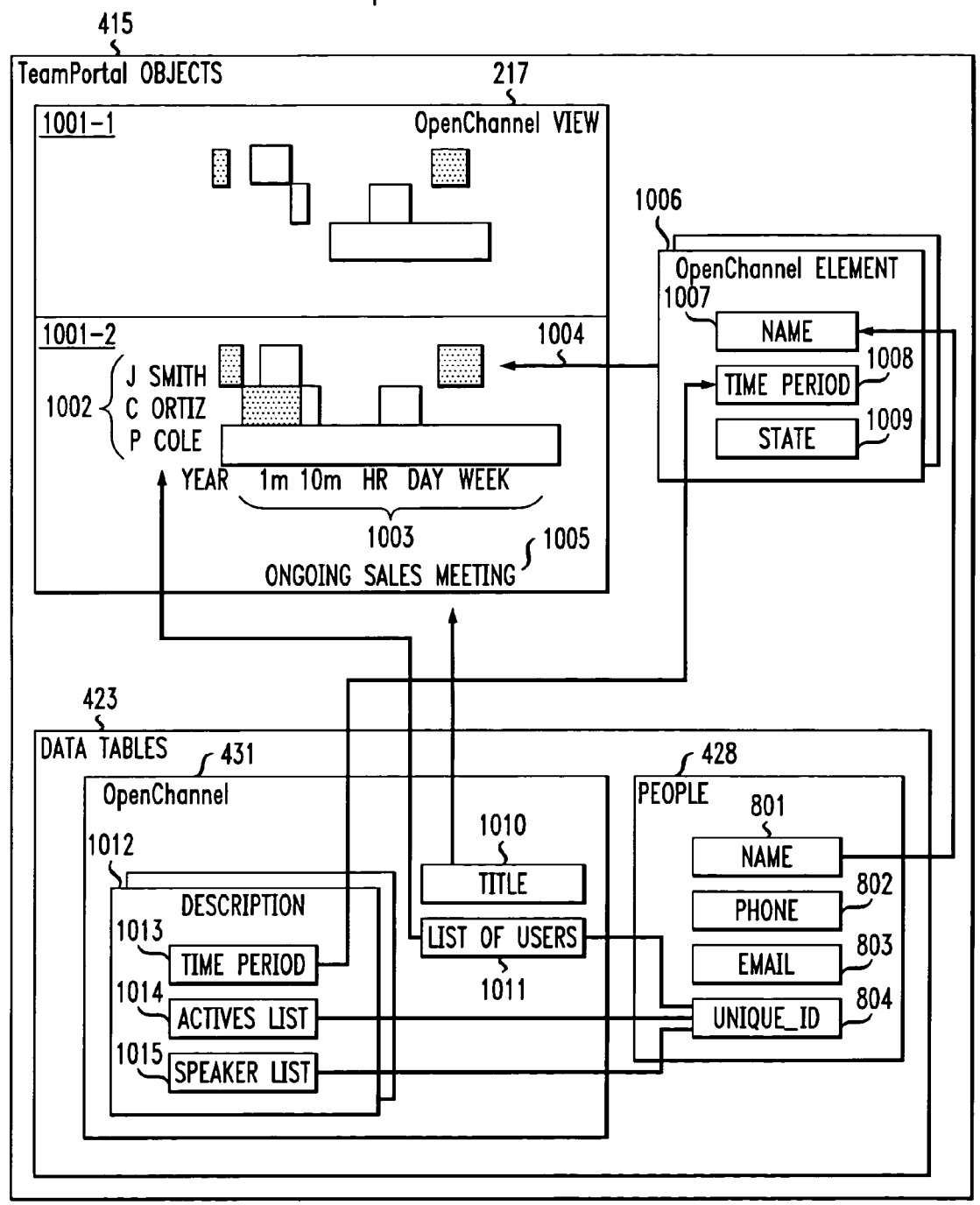
FIG. 10 is a flow diagram illustrating TeamPortal objects for an OpenChannel™ View of the details.

FIG. 10 is a flow diagram illustrating TeamPortal objects for an OpenChannel View 217 of a conference call. In this diagram, the OpenChannel data table 431 is shown to have a title 1010 and a list of users 1011 for each OpenChannel View. The OpenChannel View 217 includes a scrolling list of views of individual OpenChannel Views 1001, each of which has a vertical axes 1002 including of all the participants in the OpenChannel View, a horizontal time axis 1003, a caption 1005 and element 1004 drawn on the plot. The graphic element 1004 is derived from a virtual element 1006 that indicates, for a particular time period 1008 and person 1007, what their activity state 1009 was.

The OpenChannel View 217 gives a list of views of individual OpenChannel Views 1001, and may be scrolled when the OpenChannel View list is large. Each OpenChannel View 1001 is drawn as follows:

1) A horizontal time axis 1003 is created which has a number of scales. In this example implementation, there are six equal divisions of screen width for time ranges:
   <1 minute
   1 minute to 10 minutes
   10 minutes to 1 hour
   1 hour to 1 day
   1 day to 1 week
   1 week to one year.
2) A categorical vertical axis 1002 is created which assigns one position on the axis (a fixed extent) to each person listed in the set of OpenChannel View users 1011. The names are extracted by using the unique id given in the OpenChannel list of users 1011 as a key into the "people" table 428.
3) The records in the OpenChannel table 431 are given as lists of users 1011, 1014 and 1015 for given time periods 1013. These are de-aggregated into OpenChannel Elements 1006, so that each OpenChannel Element 1006 encodes data for a single user 1007 for a single time period 1008.
4) The axes 1002 and 1003 and the title 1005 of the view are drawn in the view 1001 as shown in FIG. 9.
5) Each OpenChannel Element 1004 is drawn with left and right extents defined by mapping the time period 1008 start and end onto the horizontal axis 1003, and with top and bottom extent defined by the mapping of the 'name' parameter 1007 on to the vertical axis 1002. The color of the element defines the state 1009 of the person at that time. In this example implementation, black is used to denote a speaker and white a listener, so that in the diagram below we see that "J Smith" is currently speaking, with "C. Ortiz" speaking just before and for almost 10 minutes previously. "P Cole" has been listening continously for many weeks.

Figure 11:
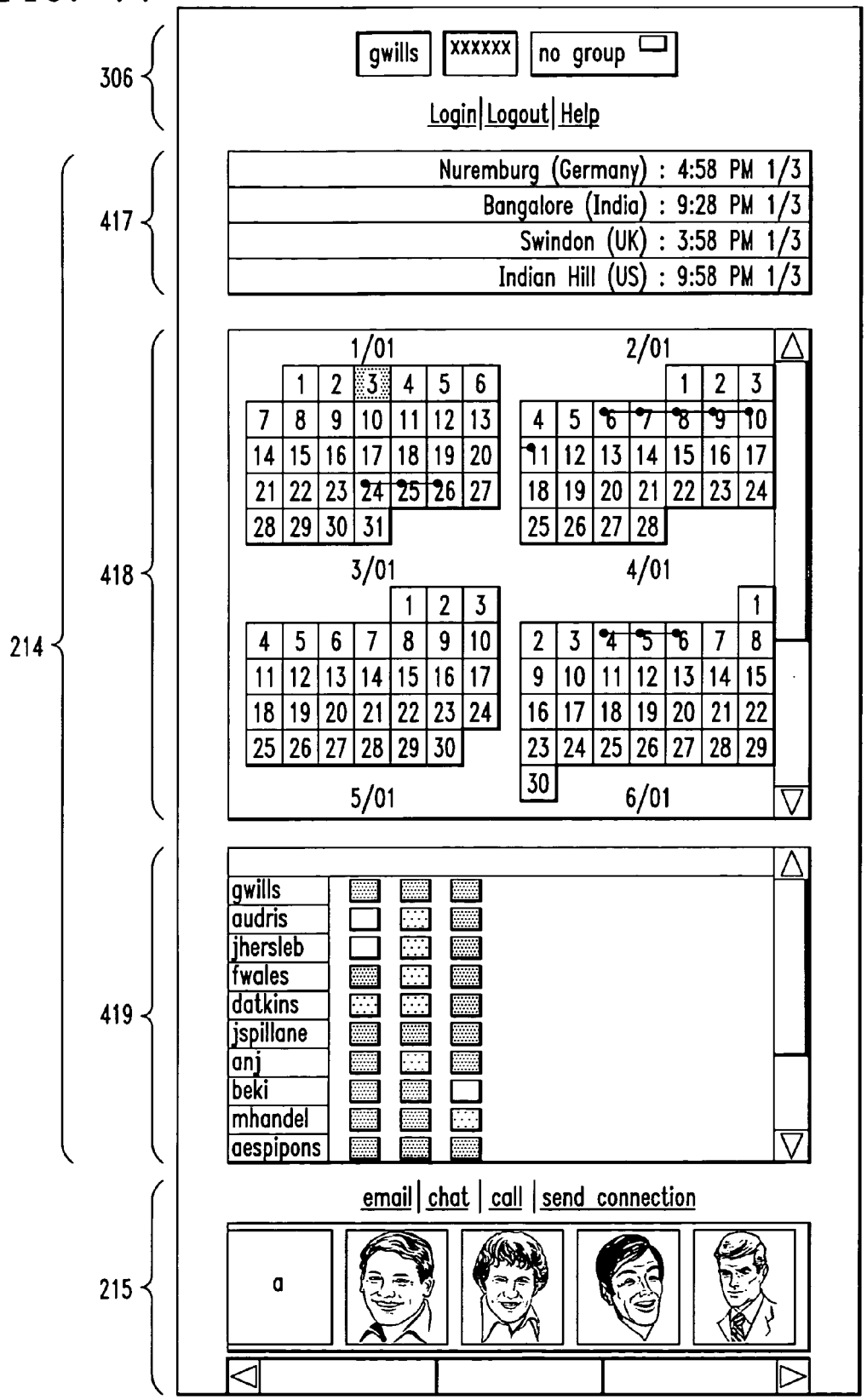
FIG. 11 shows elements employed in a TeamPortal application.

FIG. 11 shows a frame of a browser running TeamPortal View 214 and the ConnectIcon View 215. In globally distributed work, it is very difficult to know when your co-workers are available. They may live in many different time zones, and observe entirely different holidays. It can be very frustrating, after calling your colleague in Bangalore all day, to discover that it is Independence Day in India. In addition, it would be useful to know the current state of your colleagues' devices, i.e., if they've recently used their computer keyboards, or their office phones. Placing calls to the best device at any given moment with only a click makes voice contact far faster and more likely to complete.

This functionality is provided by TeamPortal View 214, which enables a user to select a set of people that he or she needs to stay closely in touch with. For this set of people, TeamPortal View 214 displays the right set of world clocks, as well as world calendars with holidays for the relevant countries. With a single click one can also access the permitted entries of each person's individual calendar.

The presence panel is where the service begins to take advantage of convergence. For each person, a set of icons to the right of the person's name indicates recent activity (or inactivity) of the person's devices. One might see, for example, that Audris used his office phone about 15 minutes ago (light blue square in first column), and is currently using his desktop computer (green square in second column). If you need to reach Audris, a single click on his office phone icon will, depending on your and his individual preferences, connect you by softphones or regular POTS phones in your offices.

Beki, on the other hand, has shown no recent computer activity today, and has not taken or made a call recently from her office phone. Her cell phone is on, however, so you can place a conference call to Audris and Beki from the desktop by selecting both of the appropriate icons. If one or both of them is unavailable, you can set an alarm, and TeamPortal View 214 will notify you as soon as both of them are available in the way you need, e.g., anything that will support an audio connection.

TeamPortal View 214 also supports these capabilities beyond your current team, or set of close contacts. Suppose you need to contact someone on the marketing team for a particular product. You navigate to the team's WEB page, and with a single click, TeamPortal View 214 displays the correct world clocks, calendar, and presence information for the team. If the team has designated a contact person, or a policy for specifying a contact person, only that person's contact and presence information is displayed.

Distributed work takes several times as long as comparable same-site work. How do you get the right people together at the same time to resolve an issue, negotiate a solution, or pool their knowledge? You'd like to get together as soon as all the essential people are prepared and available.

The ConnectIcon View 215 enables communication that closely approximates this ideal. The sender of a ConnectIcon View configures it with a sentence or two describing the nature of the intended meeting, the identity of the receivers, and URLs for any relevant materials. If the receiver also has TeamPortal View 214, the ConnectIcon View 215 is displayed beside the TeamPortal View 214 interface. A "mouse over" displays the text message, and a right click generates a popup menu that allows the receiver to access any of the URLs specified by the sender, access the sender's calendar, and initiate a chat, e-mail, or audio connection. In addition, the ConnectIcon View 215 also displays presence data, allowing the receiver to see if it is a good time to initiate contact to take care of the task. As soon as the receiver is prepared, and the sender is available, contact can be initiated.

For those without TeamPortal View 214, the ConnectIcon View 215 is delivered as a URL, generally as an e-mail attachment. Clicking it brings up a small iconified picture of the sender, and provides the same functionality as above.

For co-located colleagues working closely together, particularly in stressful or crisis situations, their ability to stay closely in touch just by talking to each other is a huge advantage. In fact, some organizations have experimented with locating everyone in a single room, a "war room," as a way of speeding up difficult tasks requiring coordinated activity.

Creating long-standing audio connections can create a similar, and in some ways improved, functionality. Whoever is needed, from anywhere in the world, can participate in ongoing work. Anyone can ask a question, or describe a new finding just by talking. For many problems, resolution can be accelerated by passing problem solving off between widely separated time zones, with OpenChannel View 217 providing the means for the new people to get up to speed during whatever overlap in working hours is available.

The basic long-standing audio connection is enhanced by placing all participants in an application-sharing session so they can jointly view and edit documents, or whatever other applications that might form the basis of collaborative activity. In addition, OpenChannel View 217 gives participants the opportunity to turn off the sound, if it becomes bothersome, and monitor the audio channel visually. The visualization shows who is participating in the OpenChannel View 217, who has spoken recently, and what applications are open in the application sharing session. One can listen to and/or monitor several channels at once.

Together, these three services provide truly effective ways of finding people, connecting with them as soon is it is possible to fruitfully do so, and to provide a channel for extended, background communication as well as foreground communication. By taking full advantage of the convergence offered by SPFS, Lucent is providing radically new capabilities to increase demand for its customers' services.

Figure 12A:
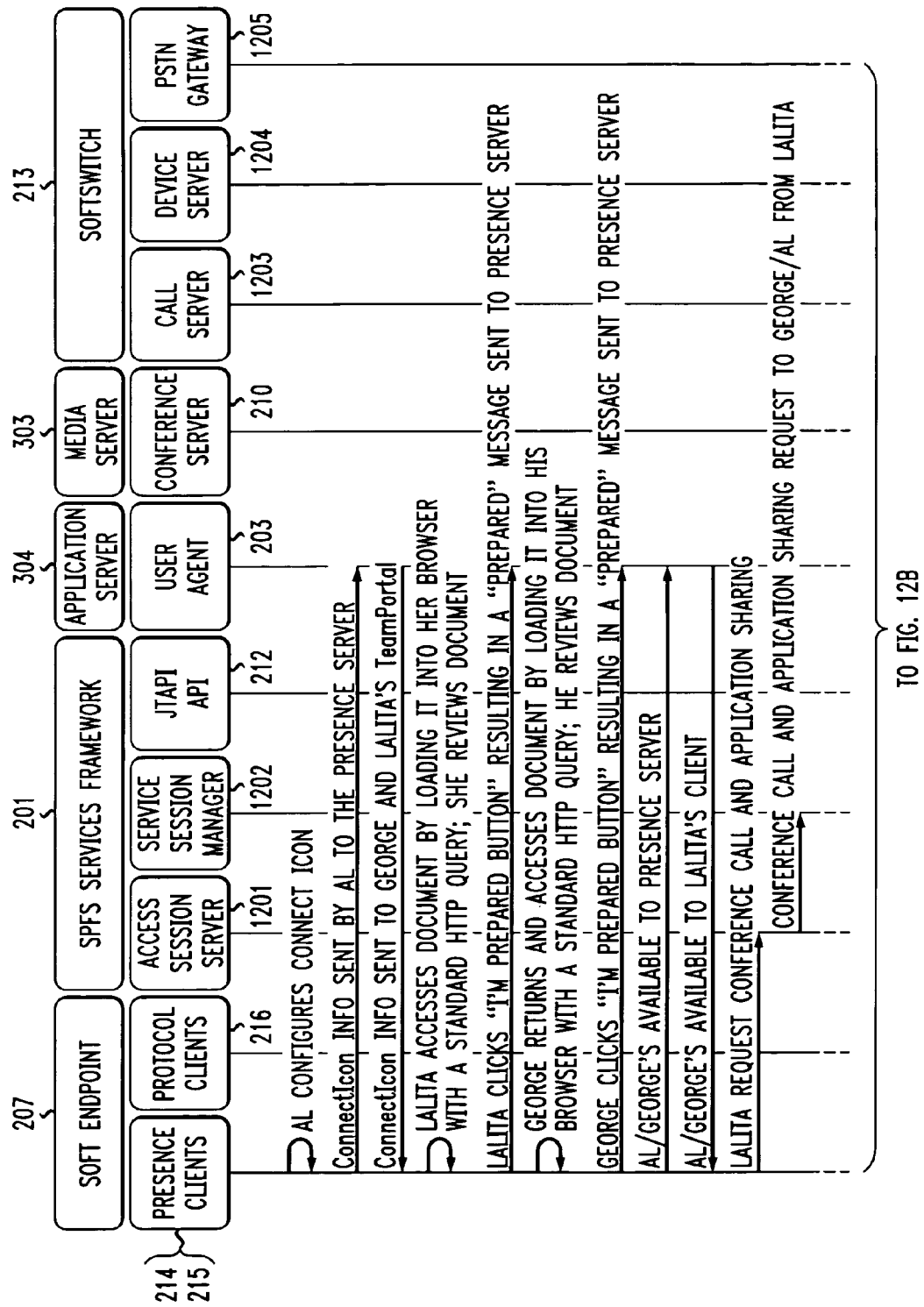
FIG. 12 shows a sequence of events effected in a ConnectIcon View scenario call flow.
Figure 12B:
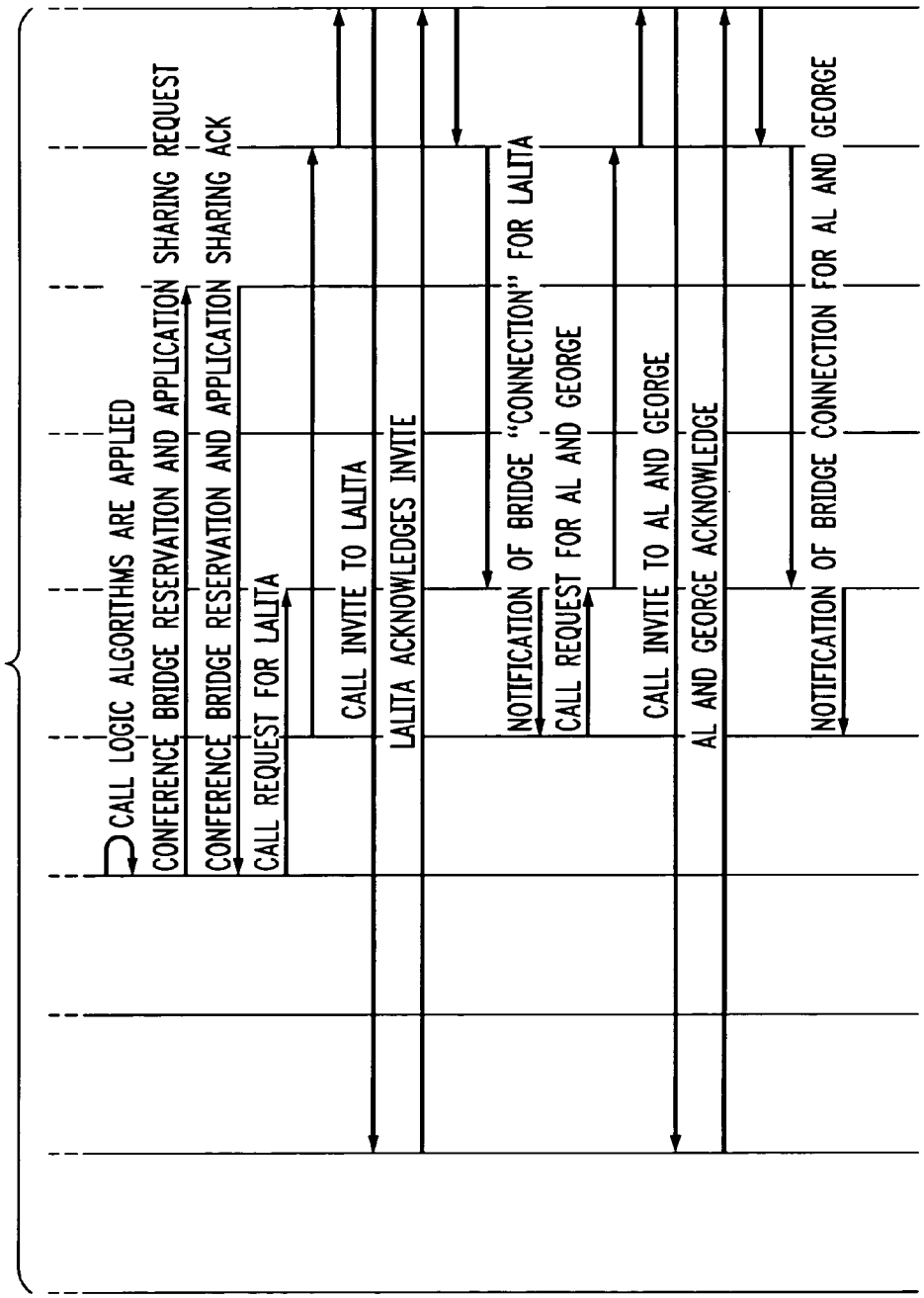
Figure 13A:
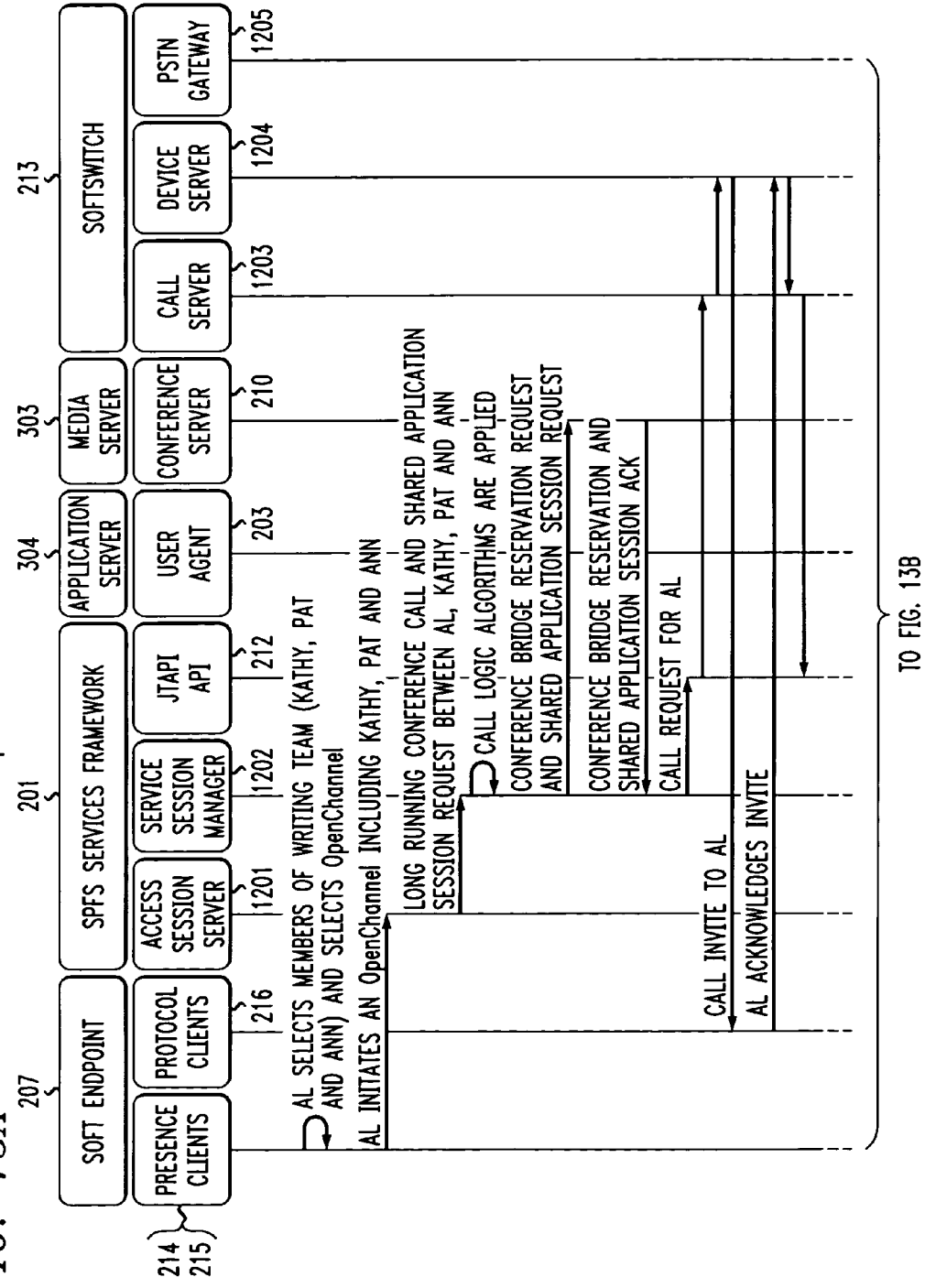
FIG. 13 shows a sequence of events effected in an OpenChannel scenario call flow.
Figure 13B:
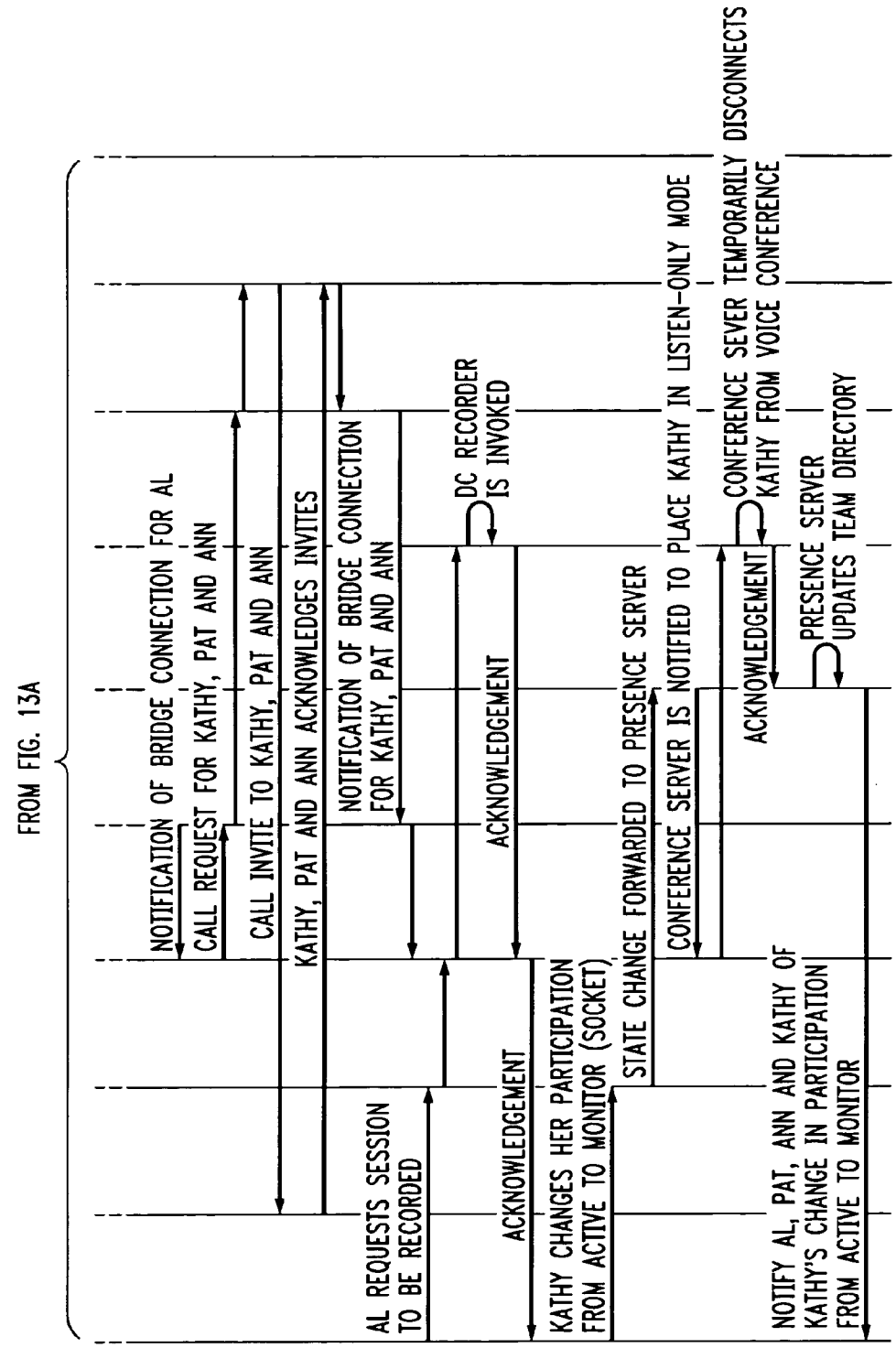

The service scenarios and call flow diagrams of FIGS. 12 and 13 illustrate how the end user utilizes the collaboration services on the SPFS and illustrate how the service framework architecture objects work together to provide the collaboration services. In these FIGS., the Soft Endpoint is the user's personal computer 207, and two internal classes of the Service Framework 201 are shown: the Access Session server 1201 and the Service Session Manager 1202. They divide up the work of the Service Framework into request handling and managing ongoing calls. They are an example of a way to write a service framework or SLEE, but other published SLEEs may use different architectures.

Elements 1203, 1204 and 1205 of the Softswitch 213 are described in published materials and their internal workings are not necessary for an understanding of FIGS. 12 and 13.

The software objects are grouped into the four major functional categories depicted in the component architecture (FIG. 2). In the scenario call flow diagrams, the complete set of software objects are not explicitly shown, and some of the objects are abstracted into functional groupings.

Some underlying assumptions concerning the scenarios include:
  All users are registered users of the collaboration services and the User Agent 203 maintains information concerning the users' preferred devise for receiving voice calls;
  The users' preferred device for receiving voice calls could be the existing circuit phone on their desk or their VoIP Soft Endpoint;
  All users have a soft endpoint environment, meaning the user has a browser that supports Java applets;
  The Softswitch 213 is provisioned to trigger JTAPI 212 for call processing for all phone numbers associated with users;
  Presence Client applets for TeamPortal View 214, OpenChannel View 217 and ConnectIcon View 215 have been downloaded and self-installed on the user's Soft Endpoint;
  A small Presence Client application 433 is installed on the users' Soft Endpoint to send presence information to the User Agent 203.

The service scenarios provide a context for how the collaboration services might be used by a customer in a service provider network. These service scenarios support the efforts of the following workers in a company:
  Al, a field representative;
  George R&D manager;
  Pat, the Marketing Manager;
  Kathy, in the Strategy Group;
  Ann, a business consultant who works from home;
  Lalita, Vice-president.

All of these people are registered users of the converged collaboration services.

As shown in FIG. 12, Al has just finished talking to a customer and has a great idea for a new product offering, which he would like to share with the R&D manager (George) and vice-president (Lalita). Al sends a ConnectIcon View 215, with a link to a proposal, to George and Lalita. As shown in the following call flow, the ConnectIcon View 215 information is sent to the User Agent and stored in the data associated with each user.

Lalita has TeamPortal View 214 up and immediately receives the ConnectIcon View 215 information over her socket connection.

She sees the ConnectIcon View 215 in her TeamPortal View 214 area.
She sees that Al is available, but George is not.
She accesses the document.
It is loaded into her browser via standard http query.

Lalita reviews the document and clicks an "I'm Prepared" button in her ConnectIcon View 215, which results in a "prepared" message being sent to the User Agent. This "prepared" status is shared with the team via the TeamPortal View 214. George is unavailable. George's TeamPortal View 214 notifies the User Agent when he returns and logs on. George sees his ConnectIcon View 215, accesses the document, reviews it, and clicks the "I'm Prepared" button in his ConnectIcon View 215.

The ConnectIcon View 215 on Lalita's TeamPortal View 214 receives notification that George has become available, and displays this information. It also indicates Al is still available. Using click-to-dial, Lalita initiates a call and application sharing session with George and Al to go over the plan.

The ConnectIcon View 215 Scenario, shown in FIG. 12, depicts this exchange showing the communication flow between the architecture components. George and Lalita love Al's idea and want a complete business plan in 5 days. Al forms a writing team including Kathy, Pat and Ann. The team decides to use OpenChannel View 217 and to record the session.

FIG. 13 illustrates the OpenChannel View 217 session and the information flow between the architecture components that support this scenario. From TeamPortal View 214, Al initiates an OpenChannel View 217 by selecting the members of the writing team in TeamPortal View 214 and then selecting "OpenChannel View 217."

Al's TeamPortal View 214 requests the Access Server to establish a (long-running) conference call involving all members of the team. The Access Server forwards the request to the Service Session Manager. After applying call logic algorithms in the appropriate Service Session modules, the reservation request is sent by the Service Session Manager to the conference server.
  The conference server acknowledges reservation request and provides information required to complete the calls concerning the conference bridge.
  The service Session Manager initiates Al's voice call set-up taking into account his preferred device (in this example it is his SoftPhone).
  Al's SoftPhone is connected to the conference bridge.
  Once Al's PC has acknowledged "connection" to the conference bridge, call requests and connections are made to Kathy, Pat, and Ann.
  The OpenChannel View 217 is now active and the team decides to start recording the session. Al initiates the record request.

For the morning of Day 2, Kathy changes her participation from Active to Monitor in order to join another strategy session.

Kathy's TeamPortal View 214 sends a notification of participation state change to the User Agent, which updates the team directory and notifies the other members of the business plan team. Kathy's participation is now identified as Monitor on the OpenChannel View 217 frame for all team members.

The actual conference call is modified as the conference server is notified to place Kathy in listen-only mode.

The service scenarios and call flow diagrams of FIGS. 12 and 13 illustrate how end users might utilize collaboration services on the SPFS and illustrate how the service framework architecture objects work together to provide the collaboration services. We have used an example of distributed work under short time schedules that is supported by presence information, long-running conference calls, and shared applications all integrated in the SPFS.

Moreover, it will be appreciated by those skilled in the art that the block diagrams herein represent conceptual views of illustrative system components embodying the principles of the invention. The functions of the various elements shown in the FIGS. would, in preferred embodiments, be implemented by one or more programmed processors, microprocessors, or the like rather than individual hardware elements. Indeed, the invention may be included in other system software or just be stand alone software that can be run as part of another system, for example, a switching system or the like.

In the claims hereof any element expressed as a means for performing a specified function is intended to encompass any way of performing that function including, for example, a) a combination of circuit elements which performs that function or b) software in any form (including, therefore, firmware, microcode or the like) combined with appropriate circuitry for executing that software to perform the function. The invention defined by such claims resides in the fact that the functionalities provided by the various recited means are combined and brought together in the manner which the claims call for. Applicants thus regard any means which can provide those functionalities as equivalent as those shown herein.

It will be appreciated by those skilled in the art that they will be able to devise various arrangements and processes which, although not explicitly shown or described herein, embody the principles of the invention and, thus, are within its spirit and scope.

What is claimed is:

1. A method for use in a conference arrangement comprising the steps of:

enabling a plurality of participants in a group to participate in an ongoing conference;

automatically collecting participation information of each of said participants in said group, by monitoring the states of communication devices associated with said participants and making that information available to all participants;

automatically determining which of said participants in said group are currently active in said conference; and dynamically displaying a visual representation indicating which of said participants in said group are active in said conference;

wherein different ones of said participants in said group may be in different participation modes at a given point in time, the participation modes including at least an active mode in which a given participant is currently active in said conference and a monitor mode in which the given participant is monitoring said conference but is not currently active in said conference;

wherein the step of automatically collecting participation information by monitoring the states of communication devices associated with said participants further comprises monitoring the states of communication devices associated with said participants regardless of whether particular ones of said participants are in the active mode or the monitor mode; and wherein the step of dynamically displaying a visual representation indicating which of said participants in said group are active in said conference further comprises dynamically displaying a visual representation comprising participation history information indicative of which of the participation modes particular ones of said participants have been in at certain points in time.

2. The method as defined in claim 1 further including a step of enabling participants of said group not currently active in said conference to monitor said conference.

3. The method as defined in claim 2 further including a step of enabling said participants monitoring said conference to become active in said conference.

4. The method as defined in claim 2 further including a step of enabling said participants monitoring said conference to listen to said conference.

5. The method as defined in claim 1 further including a step of automatically collecting information on whether said active participants have spoken in said conference.

6. The method as defined in claim 1 further including a step of automatically collecting information regarding prior conference participation of each of said participants.

7. The method as defined in claim 6 wherein said prior participation information includes at least whether a participant was active in the conference.

8. The method as defined in claim 7 wherein said prior participation information further includes whether a participant spoke in the conference.

9. The method as defined in claim 6 wherein said step of collecting participation information includes a step of collecting information on whether a participant has been active and/or an actual speaker in the conference during the conference.

10. The method as defined in claim 6 wherein said step of collecting participation information further includes a step of collecting said participation information for prescribed intervals of said conference.

11. The method as defined in claim 10 wherein said prescribed intervals include at least each day of the conference interval, each hour of each said day, each minute of each of said hours and each second of each of said minutes.

12. Apparatus for use in a conference arrangement comprising:

a set up unit to enable a plurality of participants in a group to participate in an ongoing conference;

a monitor to automatically monitor states of communication devices associated with said participants and make that information available to all participants, and to collect participation information of each of said participants in said group and to automatically determine which of said participants in said group are currently active in said conference; and a display unit to dynamically display a visual representation indicating which of said participants in said group are active in said conference;

wherein said set up unit is configured such that different ones of said participants in said group may be in different participation modes at a given point in time, the participation modes including at least an active mode in which a given participant is currently active in said conference and a monitor mode in which the given participant is monitoring said conference but is not currently active in said conference;

wherein said monitor is configured to monitor the states of communication devices associated with said participants regardless of whether particular ones of said participants are in the active mode or the monitor mode; and wherein the display unit is configured to dynamically display a visual representation comprising participation history information indicative of which of the participation modes particular ones of said participants have been in at certain points in time.

13. The apparatus as defined in claim 12 wherein said set up unit further enables participants of said group not currently active in said conference to monitor said conference.

14. The apparatus as defined in claim 13 wherein said set up unit further enables said participants monitoring said conference to become active in said conference.

15. The apparatus as defined in claim 13 wherein said set up unit further enables said participants monitoring said conference to listen to said conference.

16. The apparatus as defined in claim 12 wherein said monitor further automatically collects information on whether said active participants have spoken in said conference.

17. The apparatus as defined in claim 16 wherein said monitor further automatically collects information regarding prior conference participation of each of said participants.

18. The apparatus as defined in claim 17 wherein said prior participation information includes at least whether a participant was active in the conference.

19. The apparatus as defined in claim 18 wherein said prior participation information further includes whether a participant spoke in the conference.

20. The apparatus as defined in claim 19 wherein said monitor further automatically collects information on whether a participant has been active and/or an actual speaker in the conference during the conference.

21. The apparatus as defined in claim 20 wherein said monitor further automatically collects said participation information for prescribed intervals of said conference.

22. The apparatus as defined in claim 20 wherein said prescribed intervals include at least each day of the conference interval, each hour of each said day, each minute of each of said hours and each second of each of said minutes.

* * * * *